United States Patent
Chung et al.

(10) Patent No.: US 9,848,248 B2
(45) Date of Patent: Dec. 19, 2017

(54) DIGITAL DEVICE AND METHOD OF PROCESSING SERVICE THEREOF

(71) Applicant: LG ELECTRONICS INC., Seoul (KR)

(72) Inventors: Wooseong Chung, Seoul (KR); Chongsok Kim, Seoul (KR); Hongjae Maeng, Seoul (KR); Jaehan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 14/705,443

(22) Filed: May 6, 2015

(65) Prior Publication Data

US 2015/0326923 A1    Nov. 12, 2015

(30) Foreign Application Priority Data

May 7, 2014    (KR) ........................ 10-2014-0054189

(51) Int. Cl.
*H04N 21/81*    (2011.01)
*H04N 21/643*    (2011.01)
(Continued)

(52) U.S. Cl.
CPC ............. *H04N 21/81* (2013.01); *H04N 19/44* (2014.11); *H04N 21/2362* (2013.01);
(Continued)

(58) Field of Classification Search
CPC ........... H04N 21/4622; H04N 21/4363; H04N 21/631; H04N 7/0125; H04N 13/0029; H04N 21/43635; H04N 7/0117; H04N 21/81; H04N 21/64322; H04N 21/2362; H04N 21/4402; H04N 21/434; H04N 21/440218; H04N 21/816; H04N 21/4126; H04N 21/6547; H04N 21/4345;
(Continued)

(56) References Cited

U.S. PATENT DOCUMENTS

| 2010/0128169 A1* | 5/2010 | Yi ........................ H04N 7/0125 348/441 |
| 2011/0231875 A1* | 9/2011 | Lee ..................... H04N 5/44513 725/38 |

(Continued)

*Primary Examiner* — Benjamin R Bruckart
*Assistant Examiner* — Aklil Tesfaye
(74) *Attorney, Agent, or Firm* — Birch, Stewart, Kolasch & Birch, LLP

(57) ABSTRACT

Embodiment(s) for a service system, a digital device and a method of processing service thereof are disclosed in the present disclosure. In this case, according to one embodiment, a digital device of processing ultra-high definition (UHD) video data includes a receiving unit configured to receive a first signal containing first UHD video data and signaling data for the first UHD video data, a decoder configured to decode the signaling data from the first signal, a user interface unit configured to receive a second signal requesting for converting the first UHD video data to second UHD video data through a remote controller, a controller configured to control a converter to convert the first UHD data to the second UHD data in response to the received second signal, the converter and a display configured to display the converted second UHD video data on a display screen.

14 Claims, 19 Drawing Sheets

(51) Int. Cl.

| | | |
|---|---|---|
| *H04N 21/2362* | (2011.01) | |
| *H04N 21/4402* | (2011.01) | |
| *H04N 21/434* | (2011.01) | |
| *H04N 21/4363* | (2011.01) | |
| *H04N 21/41* | (2011.01) | |
| *H04N 21/6547* | (2011.01) | |
| *H04N 19/44* | (2014.01) | |

(52) U.S. Cl.
CPC ....... *H04N 21/4126* (2013.01); *H04N 21/434* (2013.01); *H04N 21/4345* (2013.01); *H04N 21/4363* (2013.01); *H04N 21/43635* (2013.01); *H04N 21/4402* (2013.01); *H04N 21/440218* (2013.01); *H04N 21/64322* (2013.01); *H04N 21/6547* (2013.01); *H04N 21/816* (2013.01); *H04N 21/41* (2013.01)

(58) Field of Classification Search
CPC .................. H04N 19/44; C12Q 1/6876; C12Q 2600/178; C12Q 2600/136; C12Q 2600/16; G01N 33/6866; G01N 2500/10; G01N 2333/56; G01N 2333/565; G01N 2333/57

See application file for complete search history.

(56) References Cited

U.S. PATENT DOCUMENTS

| | | | |
|---|---|---|---|
| 2013/0276046 A1* | 10/2013 | Park | H04N 21/4302 725/110 |
| 2013/0307927 A1* | 11/2013 | Park | H04N 5/06 348/43 |
| 2015/0012933 A1* | 1/2015 | Fay | H04N 21/23605 725/27 |
| 2015/0015782 A1* | 1/2015 | Yeh | H04N 7/0122 348/445 |
| 2015/0296175 A1* | 10/2015 | Wallace | H04N 7/0125 348/445 |
| 2016/0080833 A1* | 3/2016 | Denoual | H04N 21/234327 725/116 |

\* cited by examiner

FIG. 2

| video signal specification | | data quantity | capacity after compression | HEVC apply (1/200 compression) |
|---|---|---|---|---|
| HDTV | 1920 × 1080, YUV 4:2:0, 8Bit, 30fps | 746 Mbps | 15Mbps (1/50, MPEG-2) | about 4Mbps |
| | 1280 × 720, YUV 4:2:0, 8Bit, 60fps | 660 Mbps | 13Mbps (1/50, MPEG-2) | about 3Mbps |
| 4K UHDTV | 3840 × 1260, YUV 4:2:0, 8Bit, 30fps | 3Gbps (4times of HD) | 30Mbps (1/100, H.264) | 15Mbps |
| 8K UHDTV | 7680 × 4320, YUV 4:2:0, 8Bit, 30fps | 12Gbps (16times of HD) | 120Mbps (1/100, H.264) | 60Mbps |

FIG. 11

| Syntax | No. of bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i = 0; i < N; i++) { | | |
|         ( descriptor() ) | | |
|     } | | |
|     for (i = 0; i < N1; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i = 0; i < N2; i++) { | | |
|             ( descriptor() ) | | |
|         } | | |
|     } | | |
|     CRC_32 | 32 | rpchof |
| } | | |

FIG. 12

| Syntax | No. of bits | Format |
|---|---|---|
| terrestrial_virtual_channel_table_section() { | | |
|     table_id | 8 | 0xC8 |
|     section_syntax_indicator | 1 | '1' |
|     private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for (i = 0; i < num_channels_in_section; i++) { | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for (i = 0; i ≤ N; i++) { | | |
|             descriptor() | | |
|         } | | |
|     } | | |
|     reserved | 6 | '111111' |
|     additional_descriptors_length | 10 | uimsbf |
|     for (j=0; j<N; j++){ | | |
|         additional_descriptor() | | |
|     } | | |
|     CRC_32 | 32 | rpchof |
| } | | |

FIG. 13

| Syntax | No. of bits | Mnemonic |
|---|---|---|
| event_information_section() { | | |
|     table_id | 8 | 0xC8 |
|     section_syntax_indicator | 1 | '1' |
|     private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_events_in_section | 8 | uimsbf |
|     for (j = 0; j < num_events_in_section; j++) { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text() | var | |
|         reserved | 4 | '1111' |
|         descriptors_length | 12 | |
|         for (i = 0; i < N; i++) { | 8 | |
|             ( descriptor() ) | 8 | |
|         } | | |
|     } | | |
|     CRC_32 | 32 | rpchof |
| } | | |

FIG. 14

| sei_message( ) { | C | Descriptor |
|---|---|---|
| payloadType = 0 | | |
| while(next_bits( 8 ) == 0xFF ) } | | |
| ff_byte /* equal to 0xff */ | 5 | f(8) |
| payloadType += 255 | | |
| } | | |
| last_payload_type_byte | 5 | f(8) |
| payloadType += last_payload_type_byte | | |
| payloadSize = 0 | | |
| while(next_bits( 8 ) == 0xFF ) } | 5 | f(8) |
| ff_byte /* equal to 0xff */ | | |
| payloadType += 255 | | |
| } | | |
| last_payload_type_byte | 5 | f(8) |
| payloadType += last_payload_type_byte | | |
| payloadSize = 0 | 5 | |
| } | | |

| sei_payload (payloadType, payloadSize) | c | Format |
|---|---|---|
| if(payloadType==37) | | |
| UD_subsampling_info (payloadSize ) | 5 | |

DIGITAL DEVICE AND METHOD OF PROCESSING SERVICE THEREOF

Pursuant to 35 U.S.C. §119(a), this application claims the benefit of the Korean Patent Application No. 10-2014-0054189, filed on May 7, 2014, which is hereby incorporated by reference as if fully set forth herein.

BACKGROUND OF THE INVENTION

Field of the Invention

The present invention relates to a digital device and a method for the digital device to process service, and more particularly, to a digital device processing service including ultra-high definition (UHD) video data and a method of controlling therefor.

Discussion of the Related Art

As an analog broadcasting is terminated and a digital broadcasting is carried out in full-scale, a broadcasting environment is rapidly changing. Meanwhile, a boundary between a Digital TeleVision (DTV) and a mobile device becomes unclear and an atmosphere of convergence is heightening in a digital environment. In accordance with a trend of the digital environment, a screen size of the DTV becomes relatively larger than a screen size of the mobile device and it is required for the DTV to provide service of a resolution more clear than a legacy Standard Definition (SD), a High Definition (HD) and a full-HD to users according to a demand of the users in accordance with activation of the digital broadcasting.

Along with the demand of the users, as time taken for processing a video signal is recently shortened, a coding method encoding/decoding ultra-high definition (UHD) video data is studying. A Moving Picture Experts Group (MPEG) standard also discusses and defines a part of the coding method used for processing the UHD video data. Yet, coding of the UHD video data and a systematic support to transmit coded video data are different from each other. In particular, although an MPEC video or a codec standard defines a coding method capable of coding UHD video data, other standards such as a system standard to transmit/receive signals including coded video data and the like are not defined yet. Hence, it is still hard to perform UHD video service. In order to perform the UHD video service, although a method of coding UHD video data is important, it is necessary to sufficiently discuss about a method of transmitting/receiving a signal including coded UHD video data between a transmitting end and a receiving end. Moreover, it should not ignore a compatibility problem with a legacy system.

As mentioned in the foregoing description, an era of UHDTV service is approaching in full-scale. As the UHDTV service, 4K, 8K and the like are currently discussing.

Yet, since there is no clearly defined standard for the UHD TV service yet, a standard or a manufacturer is not able to determine a chip, an interface and the like suitable for the UHD TV service.

SUMMARY OF THE INVENTION

Accordingly, the present invention is directed to an apparatus and method thereof that substantially obviate one or more problems due to limitations and disadvantages of the related art.

An object of the present invention is to provide a device configuration capable of performing such ultra-high definition (UHD) service as 4K, 8K and the like as well as legacy full-HD TV service via a single TV.

Another object of the present invention is to provide all UHD services in a single device irrespective of a type of inputted UHD service.

Another object of the present invention is to provide a device equipped with flexibility capable of providing such UHD service as 4K, 8K and the like to a user according to an input source and a user selection.

The other object of the present invention is to support such a design convenience as a chip, a hardware, a software platform and the like and a device supporting UHD service adaptive to a user request by simply securing expandability from a device used for supporting 4K UHD service to a device supporting 8K UHD service.

Technical tasks obtainable from the present invention are non-limited the above-mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Various embodiment(s) for a digital device and a method of processing service thereof are disclosed in the present disclosure.

According to one embodiment of the present invention, a method of processing UHD video data includes receiving a first signal containing first UHD video data and signaling data for the first UHD video data, parsing the signaling data from the first signal, decoding the first UHD video data based on the parsed signaling data, receiving a second signal requesting for converting the first UHD video data to second UHD video data through a remote controller, converting the first UHD video data to the second UHD video data in response to said second signal and displaying the second UHD video data on a display screen.

According to one embodiment of the present invention, a digital device of processing UHD video data includes a receiving unit configured to receive a first signal containing first UHD video data and signaling data for the first UHD video data, a decoder configured to parse the signaling data from the first signal, a user interface unit configured to receive a second signal requesting for converting the first UHD video data to second UHD video data through a remote controller, a controller configured to control a converter to convert the first UHD data to the second UHD data in response to the received second signal, the converter and a display configured to display the converted second UHD video data on a display screen.

Technical solutions obtainable from the present invention are non-limited the above mentioned technical solutions. And, other unmentioned technical solutions can be clearly understood from the following description by those having ordinary skill in the technical field to which the present invention pertains.

According to the present invention, it is able to provide a device configuration capable of performing such UHD service as 4K, 8K and the like as well as legacy full-HD TV service via a single TV. And, it is able to provide all UHD services in a single device irrespective of a type of inputted UHD service. Also, it is able to provide a device equipped with flexibility capable of providing such UHD service as 4K, 8K and the like to a user according to an input source and a user selection. Further, it is able to support such a design convenience as a chip, a hardware, a software platform and the like and a device supporting UHD service adaptive to a user request by simply securing expandability from a device used for supporting 4K UHD service to a device supporting 8K UHD service.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating an HD video content and a UHD video content in a manner of comparing with each other;

FIGS. 11 to 14 are diagrams illustrating signaling data used for processing UHD service according to embodiments of a present invention;

DETAILED DESCRIPTION OF THE INVENTION

Figure 1:
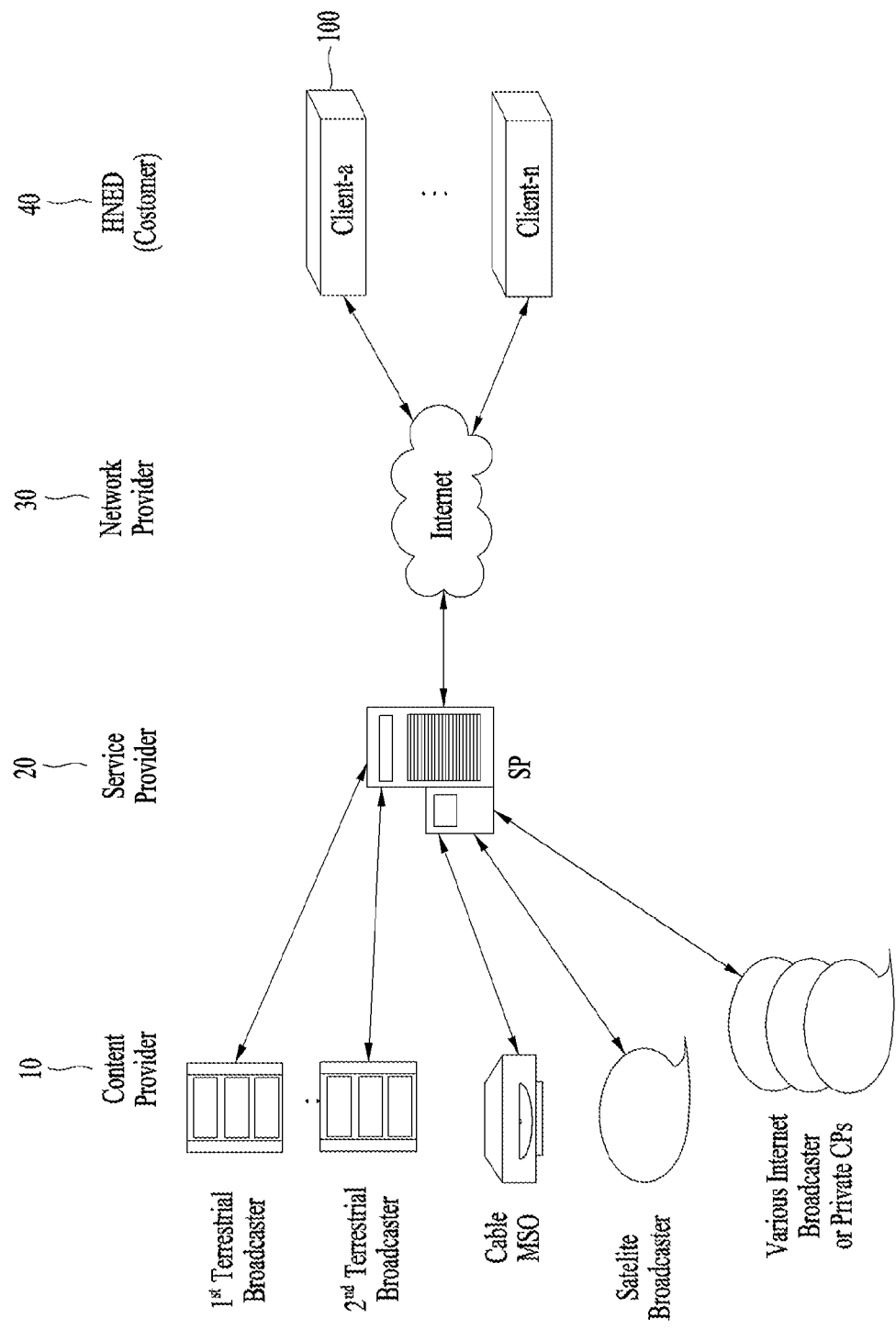
FIG. 1 is a schematic diagram illustrating a service system including a digital device according to one embodiment of a present invention.

Description will now be given in detail according to embodiments disclosed herein, with reference to the accompanying drawings.

In general, a suffix such as "module" and "unit" may be used to refer to elements or components. Use of such a suffix herein is merely intended to facilitate description of the specification, and the suffix itself is not intended to give any special meaning or function. Meanwhile, such an ordinal number as 'first-', 'second-' and the like may have a meaning of an order. Yet, the terminologies can be used for the purpose of distinguishing one component from another component capable of being overlapped with each other.

The accompanying drawings are used to help easily understand various technical features and it should be understood that the embodiments presented herein are not limited by the accompanying drawings.

In the following description of the present disclosure, ultra-high definition (UHD) video data indicates video data of a resolution 4 times (4K) or 16 times (8K) higher than a resolution of a Full High Definition (FHD). The 4K may be named an Ultra Definition (UD) and the 8K may be named a UHD as well. Yet, since the above-mentioned terminologies are not precisely determined by a related standard or an industry and are used in a manner of being mixed, the terminologies are still arbitrary. The present disclosure is explained in a manner that UHD video data is named as UHD video data.

A digital device according to an embodiment of the present invention as set forth herein may be any device that can handle any one of transmitting, receiving, handling and outputting data, content, servicer, application, and so forth. The digital device may be connected to other digital devices through wired network or wireless network, paired or connected to external server, and through the connections, the digital device may transmit and receive the prescribed data. Examples of the digital device may include standing devices such as a network TV, a Hybrid Broadcast Broadband TV (HBBTV), a smart TV, Internet Protocol TV (IPTV), and personal computer (PC), or mobile/handheld devices such as a Personal Digital Assistant (PDA), smart phone, tablet PC, or Notebook computer. For convenience of description, in this specification, the Digital TV is used in FIG. 4 and the mobile device is used in FIG. 5 depicting the digital device. Further, the digital device in this specification may be referred to configuration having only a panel, set-top box (STB), or a set including the entire system.

Moreover, the wired or wireless network described in this specification may refer to various pairing method, standard telecommunication network protocol methods supported for transmitting and receiving data between digital devices or between digital device and external server. The wired or wireless network also includes various telecommunication network protocols supported now as well as in the future. Examples of the wired or wireless network include wired network supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless network supported by various standards including Bluetooth, Radio Frequency Identification (RFID), infrared Data Association (IrDA), Ultra Wideband (UWB), ZigBee, Digital Living Network Alliance (DLNA), Wireless LAN (WLAN) (Wi-Fi), Wireless broadband (Wibro), World Interoperability for Microwave Access (Wimax), High Speed Downlink Packet (HSDPA), Long Term Evolution/LTE-Advanced (LTE/LTE-A), Wi-Fi direct, and so forth.

In addition, the specification referring simply to the digital device can include a standing device or a mobile device depending on the context, and when it is not referred to a specific device, the digital device referred in this specification refers to both standing and mobile device. Meanwhile, the digital device may perform intelligent functions such as receiving broadcasting program, operating computer functions, and supporting at least one external input, and by being connected through the network wired or wirelessly, the digital device may support e-mail functions, web browsing functions, banking, gaming, and executing applications. The digital device may further include an interface for any one of input or control means (hereinafter referred as "input means") supporting handwriting input, touch-screen, and space remote control.

Furthermore, the digital device may use a standard operating system (OS), however, the digital device described in this specification and the embodiments, uses a Web OS. Therefore, the digital device may perform functions such as adding, deleting, amending, and updating the various services and applications for standard universal OS kernel or Linux kernel in order to construct a more user-friendly environment.

When the digital device, described above, receives and handles external input, the external input includes external input devices described above, meaning all input mechanisms or digital devices, capable of transmitting and receiving data through wired or wireless network connected to and from the digital device. For example, the external input includes High Definition Multimedia Interface (HDMI), game devices such as Playstation or X-Box, smart phone, tablet PC, printing device such as pocket photo, digital devices such as smart TV and blue-ray device.

The "server" referred to as in this application, includes digital device or system capable of transmitting and receiving data to and from client, and may also be referred to as a processor. For example, the server may be servers providing services such as portal server providing web page, web content or web service, advertising server providing advertising data, content server, Social Network Service (SNS) server providing SNS service, service server providing service to manufacturer, Multichannel Video Programming Distributor (MVPD) providing Video on Demand or streaming service, and service server providing pay services. When an application is described for the convenience of explanation, the meaning of application in the context may include services as well as applications.

In the following description, various embodiments according to an embodiment of the present invention are explained with reference to attached drawings. FIG. 1 is a schematic diagram illustrating a service system including a digital device according to one embodiment of a present invention.

Referring to FIG. 1, examples of a service system comprising a digital receiver may include a content provider (CP) 10, a service provider (SP) 20, a network provider (NP) 30, and a home network end user (FINED) (Customer) 40. The HNED 40 includes a client 100, that is, a digital device.

The CP 10 produces and provides content. Referring to FIG. 1, the CP 10 can include a first or second terrestrial broadcaster, a cable system operator (SO), a multiple system operator (MSO), a satellite broadcaster, various Internet broadcasters, private content providers (CPs), etc. The CP 10 can produce and provide various services or applications as well as broadcast content.

The SP 20 service packetizes content provided by the CP 10 and provides to HNED 40. For example, the SP 20 packetizes at least one content provided by the first or second terrestrial broadcaster, the cable SO, the MSO, the satellite broadcaster, various Internet broadcasters, the private CPs for service and provides it to the HNED 40.

The SP 20 can provide services to the client 100 in a uni-cast or multi-cast manner. Meanwhile, the SP 20 can transmit data to plurality of clients which are previously registered at once, and Internet Group Management Protocol (IGMP) may be used in transmission. The CP 10 and the SP 20 can be configured in the form of one entity. For example, the CP 10 can function as the SP 20 by producing content and directly packetizing the produced content into services, and vice versa.

The NP 30 can provide a network environment for data exchange between the CP 10 and/or SP 20 and the client 100. The client 100, a consumer included in the FINED 40, can construct a home network, receive data and transmit/receive data for various services or applications such as VOD, streaming, and the like, via the NP 30.

The CP 10 and/or SP 20 included in the service system can use a conditional access or a content protection mechanism for protecting content transmitted. In this instance, the client 100 can use processing mechanism such as a cable card (or Point of Deployment (POD)) or downloadable conditional access system (DCAS), for the conditional access or protecting content. In addition, the client 100 can use a bi-directional service through a network. In this instance, the client 100 can perform or function as the CP 10. And, the SP 20 can transmit it to other client.

In FIG. 1, CP 10 and/or SP 20 can be a server providing service which specifies below in the disclosure. In this instance, the server can include the NP 30, if necessary. Further, the service or service data can include not only service or application received from the external server but also an internal service or application as above-mentioned. This service or application is defined service data or application data for the client 100 based on the Web OS.

Meanwhile, in relation to UHD service processing according to the present invention, a UHD is briefly described in the following. In the following, one embodiment of UHD service processed in an ATSC system is explained.

FIG. 2 is a diagram illustrating an HD video content and a UHD video content in a manner of comparing with each other.

According to an Advanced Television System Committee (ATSC) system, data transmission rate transmitted on a single channel corresponds to about 19.39 Mbps.

Video data can be coded by a widely known MPEG-2. Yet, as shown in FIG. 2, 1920*1080 FHD video data of which data quantity corresponds to about 746 Mbps becomes about 15 Mbps after being coded by the MPEG-2. 1280*720 HD video data of which data quantity corresponds to about 660 Mbps becomes about 13 Mbps after being coded by the MPEG-2. Hence, the FHD or the HD video data can be transmitted in a manner of being carried on a single channel of the ATSC system.

Yet, as shown in FIG. 2, 3840*2160 4k UHD video data of which data quantity corresponds to 3 Gbps is about 4 times bigger than the HD video data. Although the UHD video data is coded by H.264 instead of the MPEG-2, data quantity becomes about 30 Mbps after being coded. 7680*4320 8k UHD video data of which data quantity corresponds to 12 Gbps is about 16 times bigger than the HD video data. Although the UHD video data is coded by H.264 instead of the MPEG-2, data quantity becomes about 120 Mbps after being coded.

In other word, although 4k or 8k UHD video data is coded by a legacy codec, it is impossible to transmit the UHD video data via a single channel of the aforementioned ATSC system. Hence, in order to solve the problem, there may exist two methods. One is to use a codec equipped with compression efficiency better than that of the legacy codec. Another is to efficiently use a channel.

In case of the former occasion, a current video standard defines and discusses H.265 i.e., an HEVC. Yet, although 4k UHD video data is coded by the HEVC, data quantity of the UHD video data becomes about 15 Mpbs. In case of 8k UHD video data, although the 8k UHD video data is coded by the HEVC, data quantity of the UHD video data becomes about 60 Mbps. Hence, when the HEVC is used, the 4k UHD video data can be transmitted via a channel of the ATSC system. On the contrary, it is still impossible to transmit the 8k UHD video data on a single channel of the ATSC system.

The latter case corresponds to an efficient use of a channel. Similar to a legacy three-dimensional (3D) TV, in order to efficiently use a channel, dual channels or multi channels can be used. Or, partial data can be transmitted via a terrestrial or a cable and the rest of the data can be transmitted using media different from each other such as an IP and the like. By doing so, it may transmit 8k UHD video data as well. In this case, it is required to precisely perform a signaling in order to make a receiver accurately know and process a difference between a media, a channel and the like.

Figure 3:
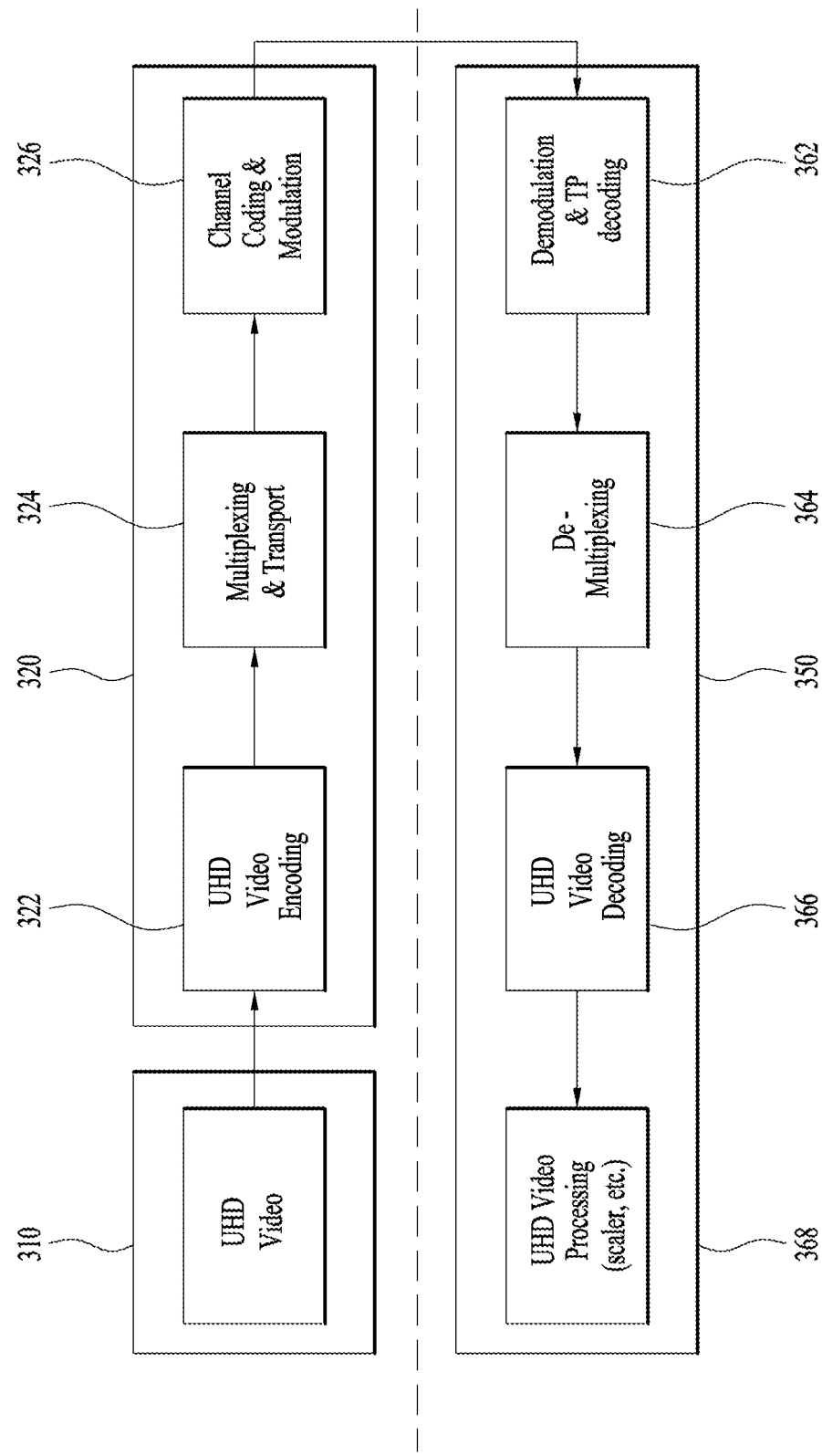
FIG. 3 is a block diagram illustrating a UHD video service system according to one embodiment of a present invention.

FIG. 3 is a block diagram illustrating a UHD video service system according to one embodiment of a present invention.

Referring to FIG. 3, a UHD video service system is divided into a transmitting end and a receiving end.

The transmitting end is classified into a content provider 310 and a service provider 320.

The content provider 310 manufactures 4K/8K UHD video data and transmits the UHD video data to the service provider 320. The content provider 310 can include all sources capable of manufacturing UHD content such as a terrestrial broadcast station, a cable headend, a private server and the like.

The service provider 320 receives the UHD content manufactured by the content provider 310 and may include all sources providing service to the receiving end via a network. In the foregoing description, the network corresponds to a concept including or supporting such a media as a terrestrial, a cable, a satellite, an IP and the like. In this case, the content provider 310 manufacturing the UHD content and the service provider 320 servicing the manufactured UHD content may correspond to an identical entity or an entity different from each other.

The service provider 320 can include a video encoder 322, a multiplexing/transport unit 324 and a channel coding/modulating unit 326. Meanwhile, although it is not depicted in FIG. 3, the service provider 320 may further include configuration element(s) necessary for transmitting and processing the UHD content. Besides, each of the configurations of the service provider 320 shown in FIG. 3 can be classified into a plurality of configurations or can be integrated into a single module according to a function of the configuration.

The video encoder 322 performs an encoding job necessary for servicing the manufactured UHD content. In this case, the encoding job may apply a video codec defined by a standard for a coding scheme. For instance, the aforementioned HEVC codec can be used as the video codec.

The multiplexing/transport unit 324 multiplexes the encoded UHD content received from the video encoder 322 and generates a Transport Stream (TS) to transmit a signal to the receiving end.

The channel coding/modulating unit 326 modulates a signal including Transport stream Packets (TPs) generated by the multiplexing/transport unit 324 and transmit the signal to the receiving end 350 via a coded channel.

Referring to FIG. 3, the receiving end 350 includes a demodulation/TP decoder 362, a demultiplexing unit 364, a video decoder 366 and a video processing unit 368. In this case, although 4 configurations of the receiving end 350 are depicted in FIG. 3, by which the present invention may be non-limited. It may further include a necessary configuration to output UHD service including the UHD video data on a screen.

The demodulation/TP decoder 362 demodulates a signal received via a tuned channel using a demodulation scheme corresponding to the aforementioned modulation scheme and extracts TPs from the demodulated signal and decodes the signal.

The demultiplexing unit 364 demultiplexes video data, audio data, signaling data and the like from the TPs extracted from the decoded signal via Packet Identifier (PID) filtering.

The video decoder 366 decodes UHD video data demultiplexed by the demultiplexing unit 364 with a decoding scheme corresponding to the encoding scheme with reference to the demultiplexed signaling data.

The video processing unit 368 processes video data to implement such service according to a user request as UHD service and the like using the UHD video data decoded by the video decoder 366. In this case, the video processing unit 368 can include such various configurations as a scalar, a Frame Rate Converter (FRC), a formatter and the like to implement the UHD service and the like.

In the foregoing description, the signaling data can include all signaling data defined by a standard such as MPEG Program Specific Information (PSI), ATSC Program and System Information Protocol (PSIP), Digital Video Broadcasting-Service Information (DVB-SI), Digital Terrestrail Multimedia Broadcasting/China Mobile Multimedia Broadcasting (DTMB/CMMB) and the like. Although the present disclosure is mainly explained based on the ATSC PSI/PSIP, it is apparent that the present disclosure is also applicable to the DVB-SI and the like. Meanwhile, the signaling data can be named by such a terminology as system information, service information and the like depending on a standard. Besides, although FIG. 3 is explained with an example of 4k, an identical or a similar scheme can also be applied to 8k.

In the following, various embodiments of configuring a receiving end shown in FIG. 3 are described.

According to one embodiment of the present invention, UHD video data processing device includes a receiving unit configured to receive a signal including first UHD video data and signaling data for the first UHD video data, a decoder configured to decode signaling data from the signal, a user interface unit configured to receive a variable request of the identified first UHD video data from a user, a controller configured to identify that the video data corresponds to the first UHD video data from the decoded signaling data, the controller configured to variably process the first UHD video data as second UHD video data according to the received variable request of the user and an output unit configured to output the variably processed second UHD video data.

In this case, the first UHD video data corresponds to 4k UHD video data, the second UHD video data may correspond to 8k UHD video data and the first UHD video data can be inputted by at least one or more media or interfaces selected from the group consisting of a HDMI input, a terrestrial, a cable and an IP.

And, the signaling data can include at least one selected from the group consisting of a PSI/PSIP scheme, a DVB-SI scheme and an SEI message.

And, the controller includes a plurality of FRC processing units to process the first UHD video data as the second UHD video data and can control a variable processing to be performed via multi-FRC structure.

Meanwhile, in order to make the multi-FRC structure, all FRCs can be connected with each other with a cascade scheme for the variable processing or a plurality of FRCs can be connected with each other with a dual scheme for the variable processing.

The controller can be configured to control two FRCs of the multi FRC structure to be enabled to variably process first UHD video data as 8k 60 Hz-dedicated second UHD video data. Moreover, the controller can be configured to control two FRCs of the multi FRC structure to be enabled to variably process first UHD video data as 8k 120 Hz-dedicated second UHD video data.

Or, according to a different embodiment of the present invention, UHD video data processing device includes a receiving unit configured to receive a signal including first UHD video data and signaling data for the first UHD video data, a decoder configured to decode signaling data from the signal, a controller configured to identified that the video data corresponds to UHD video data from the decoded signaling data, the controller, if the identified UHD video data corresponds to 8k UHD video data, configured to control an FRC to be processed via a multi FRC structure and an output unit configured to output FRC-processed 8k UHD video data.

Figure 4:
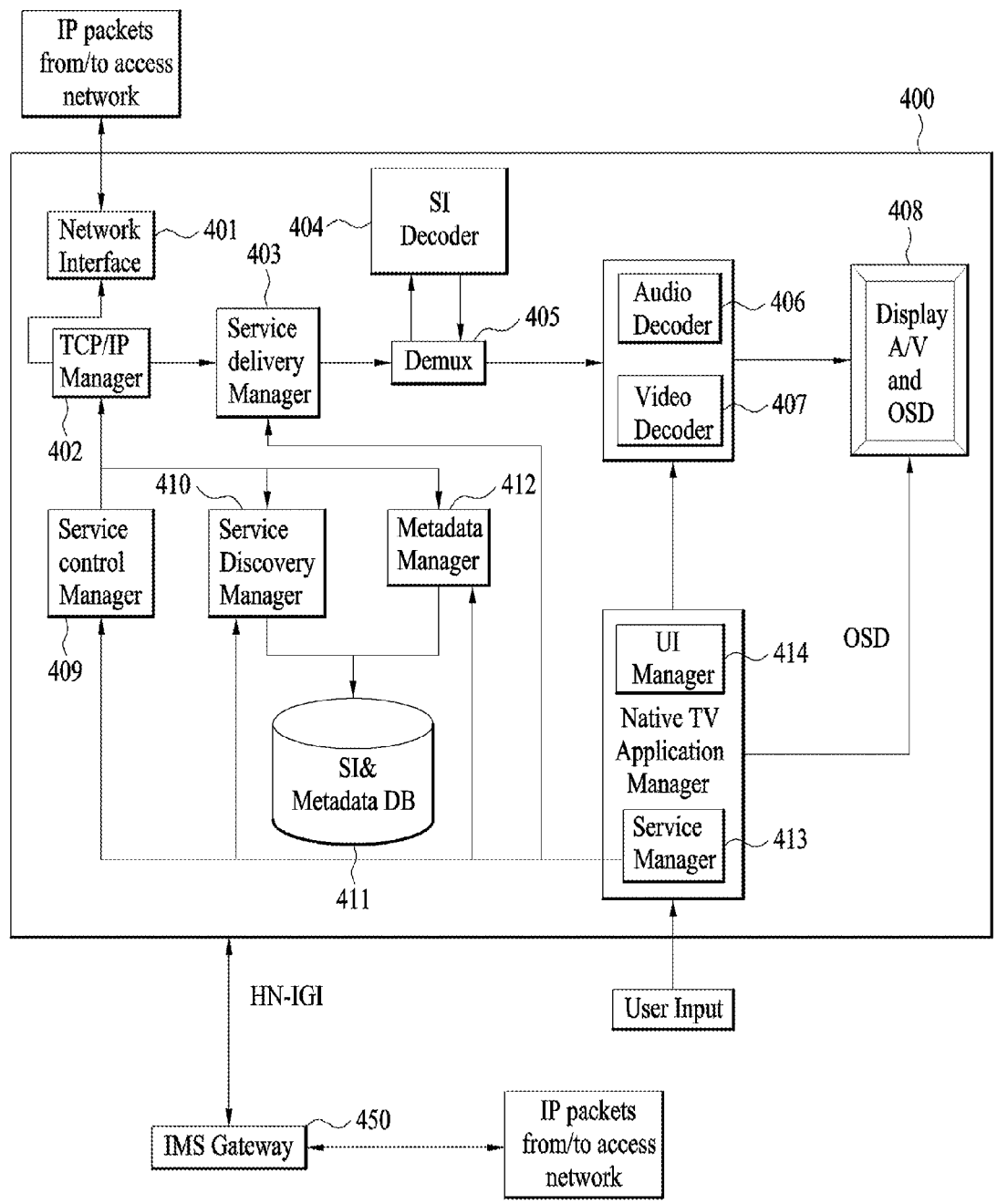
FIG. 4 is a block diagram illustrating a digital device according to one embodiment of a present invention.
Figure 5:
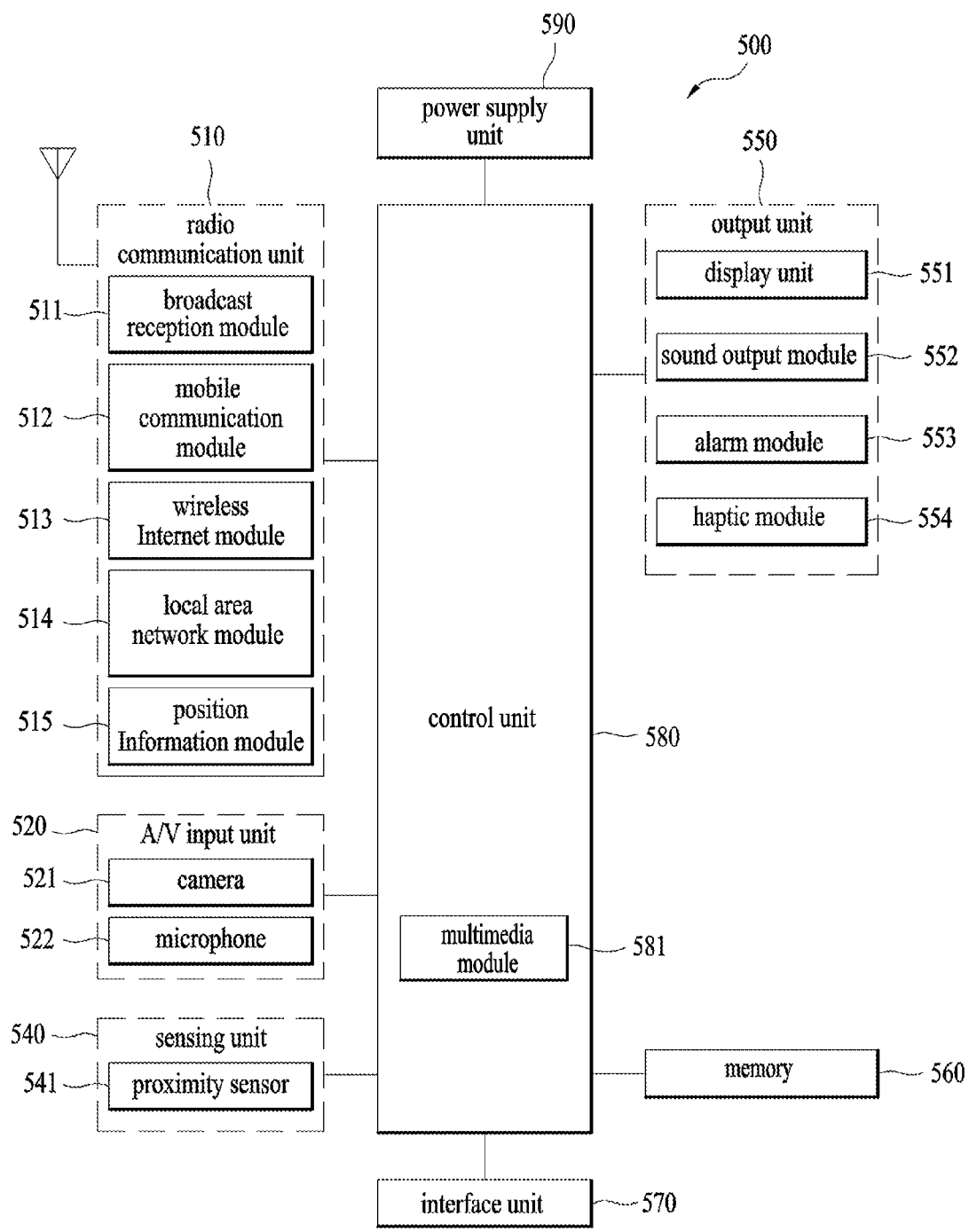
FIG. 5 is a block diagram illustrating a digital device according to another embodiment of the present invention.

FIG. 4 is a block diagram illustrating a digital device according to one embodiment of a present invention.

In the disclosure, the digital device can correspond to the client 100 shown in FIG. 1.

The digital device 400 can include a network interface 401, a TCP/IP (Transfer Control Protocol/Internet Protocol) manager 402, a service delivery manager 403, an SI (System Information, Service Information or Signaling Information) decoder 404, a demultiplexer 405, an audio decoder 406, a video decoder 407, a display A/V (Audio/Video) and OSD (On Screen Display) module 408, a service control manager 409, a service discovery manager 410, a SI & metadata database (DB) 411, a metadata manager 412, a service manage 413, a UI (User Interface) manager 414, etc.

The network interface 401 can receive or transmit IP (Internet Protocol) packets or IP datagrams (hereinafter, referred as IP packets) through a network accessed. As an example, the network interface 401 can receive service, application, content, etc., from the SP 20 of FIG. 1 through the network.

The TCP/IP manager 402 is involved in packet delivery of IP packets transmitted to the digital device 400 and IP packets transmitted from the digital device 400 between a source and a destination. The TCP/IP manager 402 may classify received packets according to an appropriate protocol and output the classified packets to the service delivery manager 405, the service discovery manager 410, the service control manager 409, and the metadata manager 412, etc.

The service delivery manager 403 can control received service data. For example, the service delivery manager 403 can use Real-Time Protocol/Real-Time Control Protocol (RTP/RTCP) to control real-time streaming data. If the real-time streaming data is transmitted using the RTP, the service delivery manager 403 can parse a received real-time streaming data packet, transmitted based on the RTP, and transmits the parsed data packet to the demultiplexer 405 or store the parsed data packet in the SI & metadata DB 411 under the control of the service manager 413. The service delivery manager 403 can provide feedback of the network reception information to the server based on the RTCP.

The demultiplexer 405 can demultiplex audio data, video data, SI data from a received packet and transmit the demultiplexed data to each of the audio/video decoder 406/407 and the SI decoder 404.

The SI decoder 404 can decode the demultiplexed SI data such as program specific information (PSI), program and system information protocol (PSIP), digital video broadcast-service information (DVB-SI), digital television terrestrial multimedia broadcasting/coding mobile multimedia broadcasting (DTMB/CMMB), etc. The SI decoder 404 can store the decoded SI data in the SI & metadata DB 411. The SI data stored in the SI & metadata DB 411 can be read and extracted by a component which requires the SI data according to user request, for example.

The audio decoder 406 and the video decoder 407 can decode the demultiplexed audio and video data, respectively. The decoded audio data and video data can be provided to the user through the display unit 408.

The application manager can include the service manager 413 and the UI manager 414, for example. The application manager can perform a function of the controller of the digital device 400. In other words, the application manager can administrate the overall state of the digital receiver 400, provides a UI, and manage other mangers.

The UI manager 414 can provide a graphic user interface (GUI)/UI for the user using OSD, etc. And, the UI manager 414 can receive a key input from the user and perform an operation of the device in response to the received key input. For example, the UI manager 414 can transmit a key input signal to the service manager 413 if the key input signal of selecting a channel is received from the user.

The service manager 413 can control service-related managers such as the service delivery manager 403, the service discovery manager 410, the service control manager 409, and the metadata manager 412.

The service manager 413 can generate a channel map and control a channel selection using the generated channel map according to the received key input from the UI manager 414. The service manager 413 can receive service information from the SI decoder 404 and set audio/video PID (packet identifier) of a selected channel to the demultiplexer 405. The set audio/video PID can be used for the demultiplexing procedure. Accordingly, the demultiplexer 405 can filter the audio data, video data and SI data using the PID (PID filtering or section filtering.)

The service discovery manager 410 can provide information required to select a service provider that provides a service. Upon receipt of a signal for selecting a channel from the service manager 413, the service discovery manager 410 discovers or searches a service based on the received signal.

The service control manager 409 can select and control a service. For example, the service control manager 409 can use perform service selection and control using IGMP or real time streaming protocol (RTSP) when the user selects a live broadcast service, and using RTSP when the user selects a VOD service. The RTSP can provide a trick mode for the real-time streaming. Also, the service manager 413 can initialized and manage a session through the IMS (IP Multimedia Subsystem) gateway 450 using IMS and SIP (Session Initiation Protocol.) The above protocols are just an example and other protocols can be used depending on an implementation.

The metadata manager 412 can manage metadata regarding services and store metadata in the SI & metadata DB 411.

The SI & metadata DB 411 can store SI data decoded by the SI decoder 404, metadata managed by the metadata manager 412, and information required to select a service provider, which is provided by the service discovery manager 410. In addition, the SI & metadata DB 411 can store system set-up data, etc.

The SI & metadata DB 411 can be implemented using a Non-Volatile RAM (NVRAM) or a Flash memory, and the like.

An IMS gateway 450 can be a gateway that collects functions required to access IPTV services based on an IMS.

FIG. 5 is a block diagram illustrating a digital device according to another embodiment of the present invention.

FIG. 4 explained above refers to a standing device as according to an embodiment of the digital device, but FIG. 5 refers to a mobile device as another embodiment of the digital device With reference to FIG. 5, the mobile terminal 500 can include a wireless communication unit 510, an A/V input unit 520, an user input unit 530, a sensing unit 540, an output unit 550, a memory 560, an interface unit 570, a controller 380, and a power supply unit 590.

Each element is explained in detail as follows.

The wireless communication unit 510 typically includes one or more components which permit wireless communication between the mobile terminal 500 and a wireless communication system or network within which the mobile terminal 500 is located. For instance, the wireless communication unit 510 can include a broadcast receiving module 511, a mobile communication module 512, a wireless Internet module 513, a short-range communication module 514, and a position-location module 515.

The broadcast receiving module 511 receives a broadcast signal and/or broadcast associated information from an external broadcast managing server via a broadcast channel. The broadcast channel may include a satellite channel and a terrestrial channel. At least two broadcast receiving modules 511 can be provided in the mobile terminal 500 to facilitate simultaneous reception of at least two broadcast channels or broadcast channel switching.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 512.

The broadcast associated information can be implemented in various forms. For instance, broadcast associated information may include an electronic program guide (EPG) and an electronic service guide (ESG).

The broadcast receiving module 511 may be configured to receive broadcast signals transmitted from various types of broadcast systems. By non-limiting example, such broadcasting systems may include digital video broadcasting-Terrestrial (DVB-T), DVB-Satellite (DVB-S), DVB-Handheld (DVB-H), DVB-Convergence of Broadcasting and Mobile Services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 511 can be configured to be suitable for other broadcasting systems as well as the above-noted digital broadcasting systems.

The broadcast signal and/or broadcast associated information received by the broadcast receiving module 511 may be stored in a suitable device, such as the memory 560.

The mobile communication module 512 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 513 supports Internet access for the mobile terminal 500. This module may be internally or externally coupled to the mobile terminal 500. The wireless Internet technology can include WLAN (Wi-Fi), Wibro, Wimax, or HSDPA.

The short-range communication module 514 facilitates relatively short-range communications. Suitable technologies for implementing this module include RFID, IrDA, UWB, as well as the networking technologies commonly referred to as Bluetooth™ and ZigBee™, to name a few.

The position-location module 515 identifies or otherwise obtains the location of the mobile terminal 500. According to one embodiment, this module may be implemented with a global positioning system (GPS) module. The GPS module 515 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 515 can calculate speed information by continuously calculating a real-time current location.

With continued reference to FIG. 5, the A/V input unit 520 is configured to provide audio or video signal input to the mobile terminal 500. As shown, the A/V input unit 520 includes a camera 521 and a microphone 522. The camera 521 receives and processes image frames of still pictures or video, which are obtained by an image sensor in a video call mode or a photographing mode. Furthermore, the processed image frames can be displayed on the display 551.

The image frames processed by the camera 521 can be stored in the memory 560 or can be transmitted to an external recipient via the wireless communication unit 510. Optionally, at least two cameras 521 can be provided in the mobile terminal 500 according to the environment of usage.

The microphone 522 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 512 in a call mode. The microphone 522 typically includes assorted noise removing algorithms to remove noise generated in the course of receiving the external audio signal.

The user input unit 530 generates input data responsive to user manipulation of an associated input device or devices. Examples of such devices include a keypad, a dome switch, a touchpad (e.g., static pressure/capacitance), a jog wheel, and a jog switch.

The sensing unit 540 provides sensing signals for controlling operations of the mobile terminal 500 using status measurements of various aspects of the mobile terminal. For instance, the sensing unit 540 may detect an open/closed status of the mobile terminal 500, the relative positioning of components (e.g., a display and keypad) of the mobile terminal 500, a change of position (or location) of the mobile terminal 500 or a component of the mobile terminal 500, a presence or absence of user contact with the mobile terminal 500, and an orientation or acceleration/deceleration of the mobile terminal 500. As an example, a mobile terminal 500 configured as a slide-type mobile terminal is considered. In this configuration, the sensing unit 540 may sense whether a sliding portion of the mobile terminal is open or closed. According to other examples, the sensing unit 540 senses the presence or absence of power provided by the power supply unit 590, and the presence or absence of a coupling or other connection between the interface unit 570 and an external device. According to one embodiment, the sensing unit 540 can include a proximity sensor 541.

The output unit 550 generates output relevant to the senses of sight, hearing, and touch. Furthermore, the output unit 550 includes the display 551, an audio output module 552, an alarm unit 553, a haptic module 554, and a projector module 555.

The display 551 is typically implemented to visually display (output) information associated with the mobile terminal 500. For instance, if the mobile terminal is operating in a phone call mode, the display will generally provide a UI or GUI which includes information associated with placing, conducting, and terminating a phone call. As another example, if the mobile terminal 500 is in a video call mode or a photographing mode, the display 551 may additionally or alternatively display images which are associated with these modes, the UI or the GUI.

The display module 551 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 500 may include one or more of such displays.

Some of the displays can be implemented in a transparent or optical transmittive type, i.e., a transparent display. A representative example of the transparent display is the TOLED (transparent OLED). A rear configuration of the display 551 can be implemented as the optical transmittive type as well. In this configuration, a user can see an object located at the rear of a terminal body on a portion of the display 551 of the terminal body.

At least two displays 551 can be provided in the mobile terminal 500 in accordance with one embodiment of the mobile terminal 500. For instance, a plurality of displays can be arranged to be spaced apart from each other or to form a single body on a single face of the mobile terminal 500. Alternatively, a plurality of displays can be arranged on different faces of the mobile terminal 500.

If the display 551 and a sensor for detecting a touch action (hereinafter called 'touch sensor') are configured as a mutual layer structure (hereinafter called 'touch screen'), the display 551 is usable as an input device as well as an output device. In this case, the touch sensor can be configured as a touch film, a touch sheet, or a touchpad.

The touch sensor can be configured to convert pressure applied to a specific portion of the display 551 or a variation of capacitance generated from a specific portion of the display 551 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 580. Therefore, the controller 580 is made aware when a prescribed portion of the display 551 is touched.

Referring to FIG. 5, a proximity sensor 541 can be provided at an internal area of the mobile terminal 500 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 541 is more durable than a contact type sensor and also has utility broader than the contact type sensor.

The proximity sensor 541 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 552 functions in various modes including a call-receiving mode, a call-placing mode, a recording mode, a voice recognition mode, and a broadcast reception mode to output audio data which is received from the wireless communication unit 510 or is stored in the memory 560. During operation, the audio output module 552 outputs audio relating to a particular function (e.g., call received, message received). The audio output module 552 may be implemented using one or more speakers, buzzers, other audio producing devices, and combinations of these devices.

The alarm unit 553 outputs a signal for announcing the occurrence of a particular event associated with the mobile terminal 500. Typical events include a call received, a message received and a touch input received. The alarm unit 553 can output a signal for announcing the event occurrence by way of vibration as well as video or audio signal. The video or audio signal can be output via the display 551 or the audio output module 552. Hence, the display 551 or the audio output module 552 can be regarded as a part of the alarm unit 553.

The haptic module 554 generates various tactile effects that can be sensed by a user. Vibration is a representative one of the tactile effects generated by the haptic module 554. The strength and pattern of the vibration generated by the haptic module 554 are controllable. For instance, different vibrations can be output by being synthesized together or can be output in sequence. The haptic module 554 can generate various tactile effects as well as the vibration. For instance, the haptic module 554 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 554 can be implemented to enable a user to sense the tactile effect through a muscle sense of a finger or an arm as well as to transfer the tactile effect through direct contact. Optionally, at least two haptic modules 554 can be provided in the mobile terminal 500 in accordance with an embodiment of the mobile terminal 500.

The memory 560 is generally used to store various types of data to support the processing, control, and storage requirements of the mobile terminal 500. Examples of such data include program instructions for applications operating on the mobile terminal 500, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 560. Moreover, data for various patterns of vibration and/or sound output in response to a touch input to the touch screen can be stored in the memory 560.

The memory 560 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 500 can operate in association with a web storage for performing a storage function of the memory 560 on the Internet.

The interface unit 570 may be implemented to couple the mobile terminal 100 with external devices. The interface unit 570 receives data from the external devices or is supplied with power and then transfers the data or power to the respective elements of the mobile terminal 500 or enables data within the mobile terminal 500 to be transferred to the external devices. The interface unit 570 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 500 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 500 via the corresponding port.

When the mobile terminal 500 is connected to an external cradle, the interface unit 570 becomes a passage for supplying the mobile terminal 500 with a power from the cradle or a passage for delivering various command signals input from the cradle by a user to the mobile terminal 500. Each of the various command signals input from the cradle or the power can operate as a signal enabling the mobile terminal 500 to recognize that it is correctly loaded in the cradle.

The controller 580 typically controls the overall operations of the mobile terminal 500. For example, the controller 580 performs the control and processing associated with voice calls, data communications, and video calls. The controller 580 may include a multimedia module 581 that provides multimedia playback. The multimedia module 581 may be configured as part of the controller 580, or implemented as a separate component. Moreover, the controller 580 can perform a pattern (or image) recognizing process for recognizing a writing input and a picture drawing input performed on the touch screen as characters or images, respectively.

The power supply unit 590 provides power required by various components of the mobile terminal 500. The power may be internal power, external power, or combinations of internal and external power.

Various embodiments described herein may be implemented in a computer-readable medium using, for example, computer software, hardware, or some combination of computer software and hardware.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 580.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 560, and executed by a controller or processor, such as the controller 580.

Figure 6:
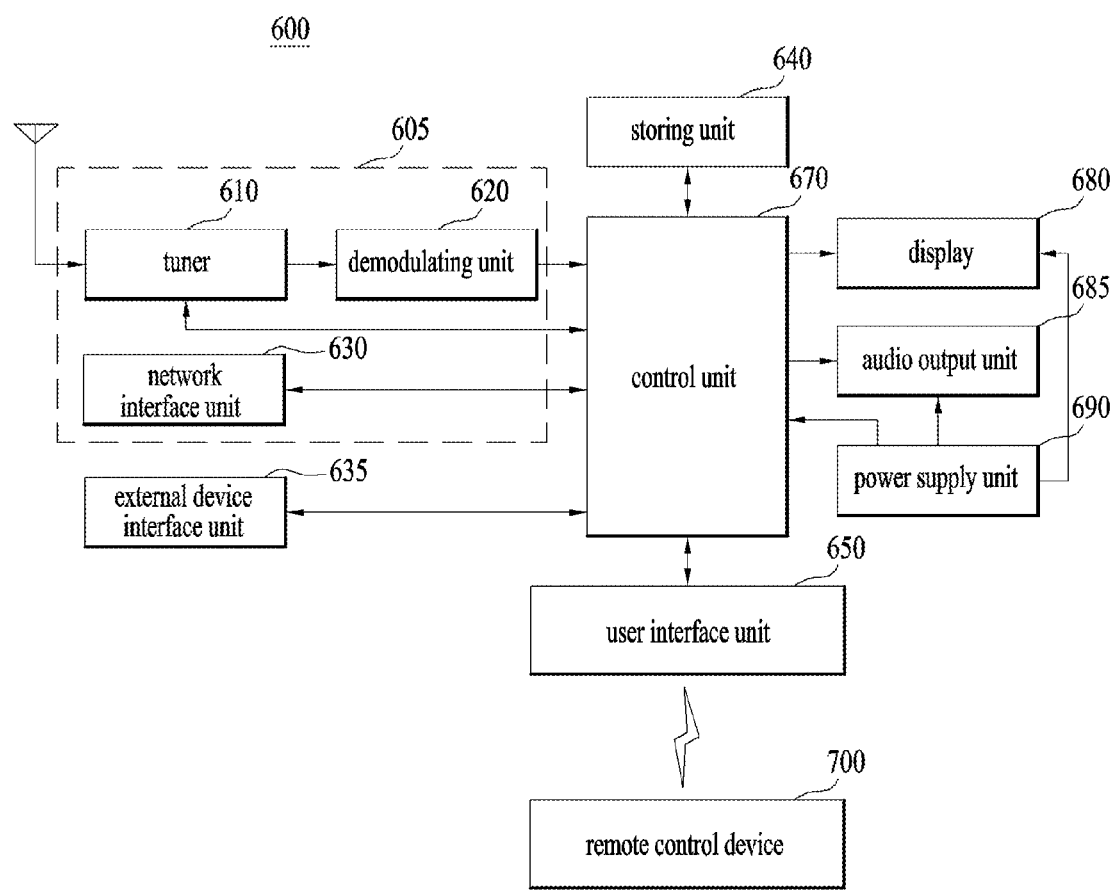
FIG. 6 is a block diagram illustrating a digital device according to other embodiment of the present invention.

FIG. 6 is a block diagram illustrating a digital device according to other embodiment of the present invention.

The digital device 600 according to another embodiment of the present invention can include a broadcast receiving unit 605, an external device interface 635, a storage unit 640, a user input interface 650, a controller 670, a display unit 680, an audio output unit 685, a power supply unit 690, and a photographing unit (not shown). Here, the broadcast receiving unit 305 can include at least one of tuner 610 and a demodulator 620, and a network interface 630. The broadcast receiving unit 605 can include the tuner 610 and the demodulator 620 without the network interface 630, or can include the network interface 630 without the tuner 610 and the demodulator 620. The broadcast receiving unit 605 can include a multiplexer (not shown) to multiplex a signal, which is demodulated by the demodulator 620 via the tuner 610, and a signal received through the network interface 630. In addition, the broadcast receiving unit 605 can include a demultiplexer (not shown) and demultiplex a multiplexed signal, a demodulated signal, or a signal received through the network interface 630.

The tuner 610 can receive a radio frequency (RF) broadcast signal, through an antenna, by tuning to a channel selected by the user or all previously stored channels. Also, the tuner 610 can convert the received RF broadcast signal into an IF (Intermediate Frequency) signal or a baseband signal.

For example, if the received RF broadcast signal is a digital broadcast signal, it is converted to a digital IF (DIF) signal, and if the received RF broadcast signal is an analog broadcast signal, it is converted to an analog baseband image or a voice signal (CVBS/SIF). That is, the tuner 610 can process both the digital broadcast signal and the analog broadcast signal. The analog baseband image or a voice signal (CVBS/SIF) output from the tuner 610 can be directly input to the controller 670.

The tuner 610 can receive a RF broadcast signal of single carrier or multiple carriers. The tuner 610 can sequentially tune and receive a RF broadcast signal of all broadcast channel stored by a channel memory function among RF broadcast signal received through an antenna to. And, the tuner 610 can covert the received RF broadcast signal into the DIF (Digital Intermediate Frequency or baseband frequency.)

The demodulator 620 receives the DIF signal, demodulates the received DIF signal, and performs a channel decoding, etc. For this, the demodulator 620 includes a trellis decoder, a de-interleaver, a Reed-Solomon decoder, etc., or includes a convolution decoder, the de-interleaver, the Reed-Solomon decoder, etc.

The demodulator 620 can outputs a transport stream (TS) after performing a demodulation and a channel decoding. At this time, the TS signal can be a signal by multiplexing a video signal, an audio signal or a data signal. As an example, the TS signal can be an MPEG-2 TS by multiplexing an MPEG-2 standard video signal, a Dolby (AC-3 standard) audio signal, etc.

A TS signal output from the demodulator 620 can be input to the controller 670. The controller 670 can control demultiplexing, processing audio/video signal, etc. Furthermore, the controller 670 can control outputting video through the display unit 680 and outputting audio through the audio output unit 685.

The external device interface 635 can provide an environment for interfacing external devices with the digital device 600. To implement this, the external device interface 635 can include an A/V input/output unit (not shown) or an RF communication unit (not shown).

The external device interface 635 can be connected with external devices such as a digital versatile disk (DVD), a Blu-ray player, a game device, a camera, a camcorder, a computer (notebook computer), a tablet PC, a smart phone, a Bluetooth device, a Cloud and the like in a wired/wireless manner. The external device interface 635 transfer a signal to the controller 670 of the digital device. The signal includes image data, video data, audio data which is input through an external device. The external device is connected to the digital device. The controller 670 can control to output the signal including the processed image data, the processed video data and the processed audio data to the connected external device. For this, the external device interface 635 can further include an A/V input/output unit (not shown) or a wireless communication unit (not shown).

The A/V input/output unit may include a USB terminal, a CVBS terminal, a component terminal, an S-video terminal (analog), a DVI terminal, a HDMI terminal, an RGB terminal, a D-SUB terminal, etc.

The RF communication unit can perform near field communication. The digital receiver 600 can be networked with other electronic apparatuses according to communication protocols such as Bluetooth, RFID, IrDA, UWB, ZigBee, and DLNA, for example.

Also, the external device interface 635 can connect a STB via at least one interface described above, and perform an input/output operation with the connected STB.

Meanwhile, the external device interface 635 can receive application or application list included in a nearby external device, and can transfer the application or the application list to the controller 670 or the storage unit 640.

The network interface 630 may provide an interface for connecting the digital receiver 600 to wired/wireless networks.

Using the network interface 630, the digital receiver can transmit/receive data to/from other users or other electronic apparatuses or access a predetermined web page through a network connected thereto or another network linked to the connected network.

The network interface 630 can selectively receive a desired application from among publicly open applications through a network.

Also, the network interface 630 can select a wanted application among open applications and the selected application via a network.

The storage unit 640 may store programs for signal processing and control and store a processed video, audio or data signal.

In addition, the storage unit 640 may execute a function of temporarily storing a video, audio or data signal input from the external device interface 635 or the network interface 630. The storage unit 640 may store information about a predetermined broadcast channel through a channel memory function.

The storage unit 640 can store an application or a list of applications input from the external device interface 635 or the network interface 630.

The storage unit 640 may store various platforms which will be described later.

The storage unit 640 can include storage media of one or more types, such as a flash memory type, a hard disk type, a multimedia card micro type, a card type memory (e.g., SD or XD memory), RAM, EEPROM, etc. The digital receiver 600 may reproduce content files (a video file, a still image file, a music file, a text file, an application file, etc.) and provide them to the user.

While FIG. 6 illustrates an embodiment in which the storage unit 640 is separated from the controller 670, the configuration of the digital receiver 600 is not limited thereto and the storage unit 640 may be included in the controller 670.

The user input interface 650 may transmit a signal input by the user to the controller 670 or deliver a signal output from the controller 670 to the user.

For example, the user input interface 650 can receive control signals such as a power on/off signal, a channel selection signal, an image setting signal, etc. from the remote controller or transmit control signals of the controller 670 to the remote controller according to various communication schemes such as RF communication, IR communication, and the like.

The user input interface 650 can transmit control signals input through a power key, a channel key, a volume key, and a local key (not shown) of a set value to the controller 670.

The user input interface 650 can transmit a control signal input from a sensing unit (not shown) which senses a gesture of the user or deliver a signal of the controller 670 to the sensing unit (not shown). Here, the sensing unit (not shown) may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 670 can generate and output a signal for video or audio output by demultiplexing streams input through the tuner 610, the demodulator 620 or the external device interface 635 or processing demultiplexed signals.

A video signal processed by the controller 670 can be input to the display unit 380 and displayed as an image through the display unit 680. In addition, the video signal processed by the controller 670 can be input to an external output device through the external device interface 635.

An audio signal processed by the controller 670 can be applied to the audio output unit 685. Otherwise, the audio signal processed by the controller 670 can be applied to an external output device through the external device interface 635.

The controller 670 may include a demultiplexer and an image processor, which are not shown in FIG. 6.

The controller 670 can control the overall operation of the digital receiver 300. For example, the controller 670 can control the tuner 610 to tune to an RF broadcast corresponding to a channel selected by the user or a previously stored channel.

The controller 670 can control the digital receiver 600 according to a user command input through the user input interface 650 or an internal program. Particularly, the controller 670 can control the digital receiver 600 to be linked to a network to download an application or application list that the user desires to the digital receiver 600.

For example, the controller 670 may control the tuner 610 to receive a signal of a channel selected in response to a predetermined channel selection command received through the user input interface 650. In addition, the controller 670 may process a video, audio or data signal corresponding to the selected channel. The controller 670 may control information on a channel selected by the user to be output with a processed video or audio signal through the display unit 680 or the audio output unit 685.

Alternatively, the controller 670 may control a video signal or an audio signal received from an external apparatus, for example, a camera or a camcorder through the external device interface 635 to be output through the display unit 680 or the audio output unit 685 according to an external device image reproduction command received through the user input interface 650.

The controller 670 can control the display unit 680 to display images. For example, the controller 670 can control a broadcast image input through the tuner 610, an external input image received through the external device interface 635, an image input through the network interface 630, or an image stored in the storage unit 640 to be displayed on the display unit 680. Here, an image displayed on the display unit 680 can be a still image or video, and it can be a 2D or 3D image.

The controller 670 can control reproduction of content. Here, the content may be content stored in the digital receiver 600, received broadcast content, or content input from an external device. The content may include at least one of a broadcast image, an external input image, an audio file, a still image, an image of a linked web, and a text file.

The controller 670 can control display of applications or an application list, downloadable from the digital receiver 600 or an external network, when an application view menu is selected.

The controller 670 can control installation and execution of applications downloaded from an external network in addition to various UIs. Furthermore, the controller 670 can control an image relating to an application executed by user selection to be displayed on the display unit 680.

The digital receiver 600 may further include a channel browsing processor (not shown) which generates a thumbnail image corresponding to a channel signal or an external input signal.

The channel browsing processor can receive a stream signal (e.g., TS) output from the demodulator 620 or a stream signal output from the external device interface 635 and extract an image from the received stream signal to generate a thumbnail image. The generated thumbnail image can be directly input to the controller 670 or can be encoded and then input to the controller 670. Also, the thumbnail image can be coded into a stream and then applied to the controller 670. The controller 670 can display a thumbnail list including a plurality of thumbnail images on the display unit 680 using thumbnail images input thereto. The thumbnail images included in the thumbnail list can be updated sequentially or simultaneously. Accordingly, the user can conveniently check content of a plurality of broadcast channels.

The display unit 680 may convert a video signal, a data signal, and an OSD signal processed by the controller 670 and a video signal and a data signal received from the external device interface 635 into RGB signals to generate driving signals.

The display unit 680 may be a PDP, an LCD, an OLED, a flexible display, a 3D display or the like.

The display unit 680 may be configured as a touch-screen and used as an input device rather than an output device.

The audio output unit 685 receives a signal audio-processed by the controller 670, for example, a stereo signal, a 3.1 channel signal or a 5.1 channel signal, and outputs the received signal as audio. The audio output unit 685 can be configured as one of various speakers.

The digital receiver 600 may further include the sensing unit (not shown) for sensing a gesture of the user, which includes at least one of a touch sensor, a voice sensor, a position sensor, and an action sensor, as described above. A signal sensed by the sensing unit (not shown) can be delivered to the controller 670 through the user input interface 650.

The digital receiver 600 may further include the photographing unit (not shown) for photographing the user. Image information acquired by the photographing unit (not shown) can be supplied to the controller 670.

The controller 670 may sense a gesture of the user from an image captured by the photographing unit (not shown) or a signal sensed by the sensing unit (not shown), or by combining the image and the signal.

The power supply unit 690 may supply power to the digital receiver 600.

Particularly, the power supply unit 690 can supply power to the controller 670 which can be implemented as a system-on-chip (SoC), the display unit 680 for displaying images, and the audio output unit 685 for audio output.

The power supply unit 690 can include a converter (not shown) converting a alternating source into a direct source. For example, when the display unit 680 is implemented as a liquid panel including a plurality of backlight lamps, the power supply unit 690 can include an inverter (not shown) which is capable of performing a Pulse Width Modulation (PWM) for changing or dimming a luminance.

The remote control device 700 may transmit user input to the user input interface 650. To achieve this, the remote controller can use Bluetooth, RF communication, IR communication, UWB, ZigBee, etc.

In addition, the remote control device 700 can receive audio, video or data signal output from the user input interface 650 and display the received signal or output the same as audio or vibration.

The above-mentioned digital device 6 can be a digital broadcast receiver which is capable of processing a digital broadcast signal of a fixed or mobile ATSC method, or a digital broadcast signal of a DVB method.

The digital receivers shown in FIGS. 4 and 5 are components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention. Some of the components shown in FIG. 4 may be omitted or a component (not shown in FIG. 4) may be added as required. The digital receiver according to the present invention may not include the tuner and the demodulator, differently from the digital receivers shown in FIGS. 4 and 5, and may receive content through the network interface or the external device interface and reproduce the content.

Figure 7:
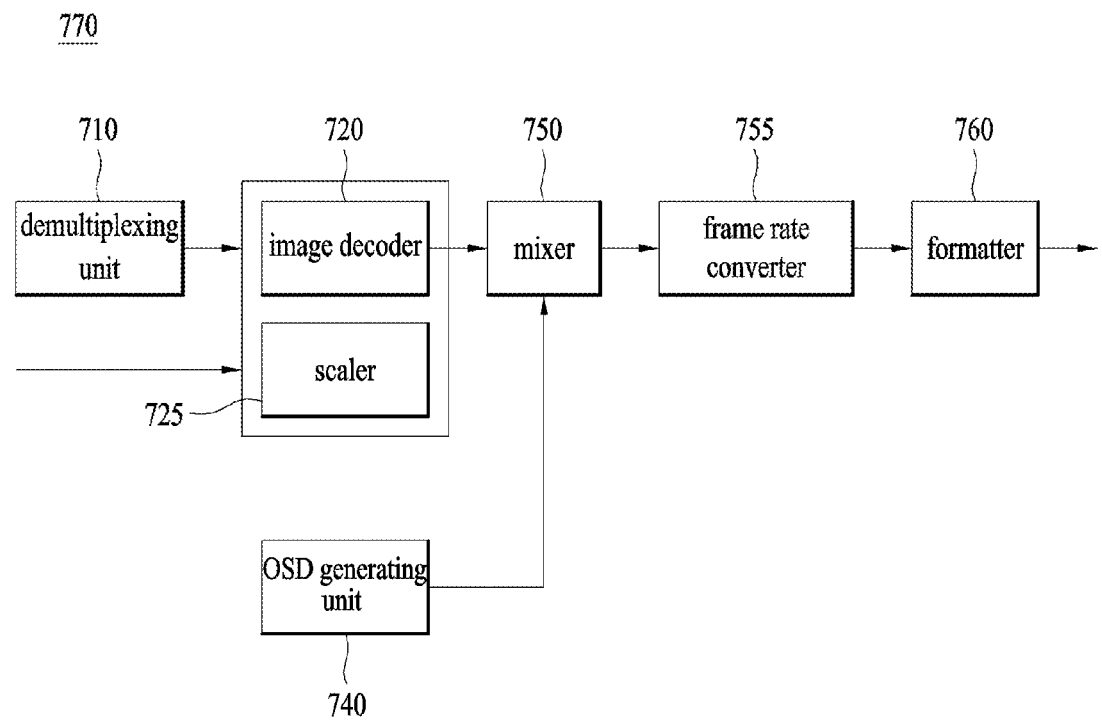
FIG. 7 is a block diagram illustrating a detailed configuration of a controller shown in FIG. 4 to FIG. 6 according to one embodiment of a present invention.

FIG. 7 is a block diagram illustrating a detailed configuration of a controller shown in FIG. 4 to FIG. 6 according to one embodiment of a present invention.

The digital receiver according to the present invention may include a demultiplexer 710, an image processor 720, an OSD generator 740, a mixer 750, a frame rate converter (FRC) 755, and a 3D formatter (or an Output formatter) 760.

The demultiplexer 710 can demultiplex an input stream signal into an MPEG-2 TS image, an audio signal and a data signal, for example.

The image processor 720 can process a demultiplexed image signal using a video decoder 725 and a scaler 735.

The video decoder 725 can decode the demultiplexed image signal and the scaler 735 can scale the resolution of the decoded image signal such that the image signal can be displayed.

The video decoder 725 can support various standards. For example, the video decoder 725 can perform a function as an MPEG-2 decoder when the video signal is coded in an MPEG-2 standard. The video decoder 725 can perform a function as a H.264 decoder when the video signal is coded in a digital multimedia broadcasting (DMB) method or the H.264 standard method.

The image signal decoded by the image processor 720 may be input to the mixer 750.

The OSD generator 740 may generate OSD data automatically or according to user input. For example, the OSD generator 740 may generate data to be displayed on the screen of an output unit in the form of an image or text on the basis of a control signal of a user input interface. OSD data generated by the OSD generator 740 may include various data such as a UI image of the digital receiver, various menu screens, widget, icons, and information on ratings. The OSD generator 740 can generate a caption of a broadcast image or data for displaying EPG based broadcast information.

The mixer 750 may mix the OSD data generated by the OSD generator 740 and the image signal processed by the image processor 720. The mixer 750 may provide the mixed signal to the 3D formatter 760. By mixing the decoded image signal and the OSD data, OSD may be overlaid on a broadcast image or external input image.

The FRC 755 may convert a frame rate of input video. For example, the frame rate converter 755 can convert the frame rate of an input 60 Hz video to a frame rate of 120 Hz or 240 Hz, according to an output frequency of the output unit. The frame rate converter 755 may be bypassed when frame conversion is not executed.

The 3D formatter 760 may change the output of the frame rate converter 755, which is input thereto, into a form suitable for the output format of the output unit. For example, the 3D formatter 760 can output an RGB data signal. In this case, this RGB data signal can be output according to low voltage differential signaling (LVDS) or mini-LVDS. When a 3D image signal output from the frame rate converter 755 is input to the 3D formatter 760, the 3D formatter 760 can format the 3D image signal such that the 3D image signal is matched to the output format of the output unit, to thereby support a 3D service.

An audio processor (not shown) may audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals.

Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal. Here, the encoded data signal may be EPG information including broadcast information such as the start time and end time (or duration) of a broadcast program which is broadcast through each channel.

Meanwhile, the above-mentioned digital device, as an embodiment according to the present invention, each component can be integrated, added or omitted according to a capability of the digital device which is actually implemented. That is, if necessary, at least two components are united into a single component or a single component is divided into at least two components. Also, a function performed by each block explains an embodiment of the present invention, the specific operation or device is not limited to a scope of the present invention.

Meanwhile, the digital device can be an image signal processing device for performing a signal of an input image or an image stored in the device. Other example of the image signal device can be a STB which does not include the display unit 680 and the audio output unit 685 shown in FIG. 6, a DVD player, a Blu-ray player, a game device, a computer, etc.

Figure 8:
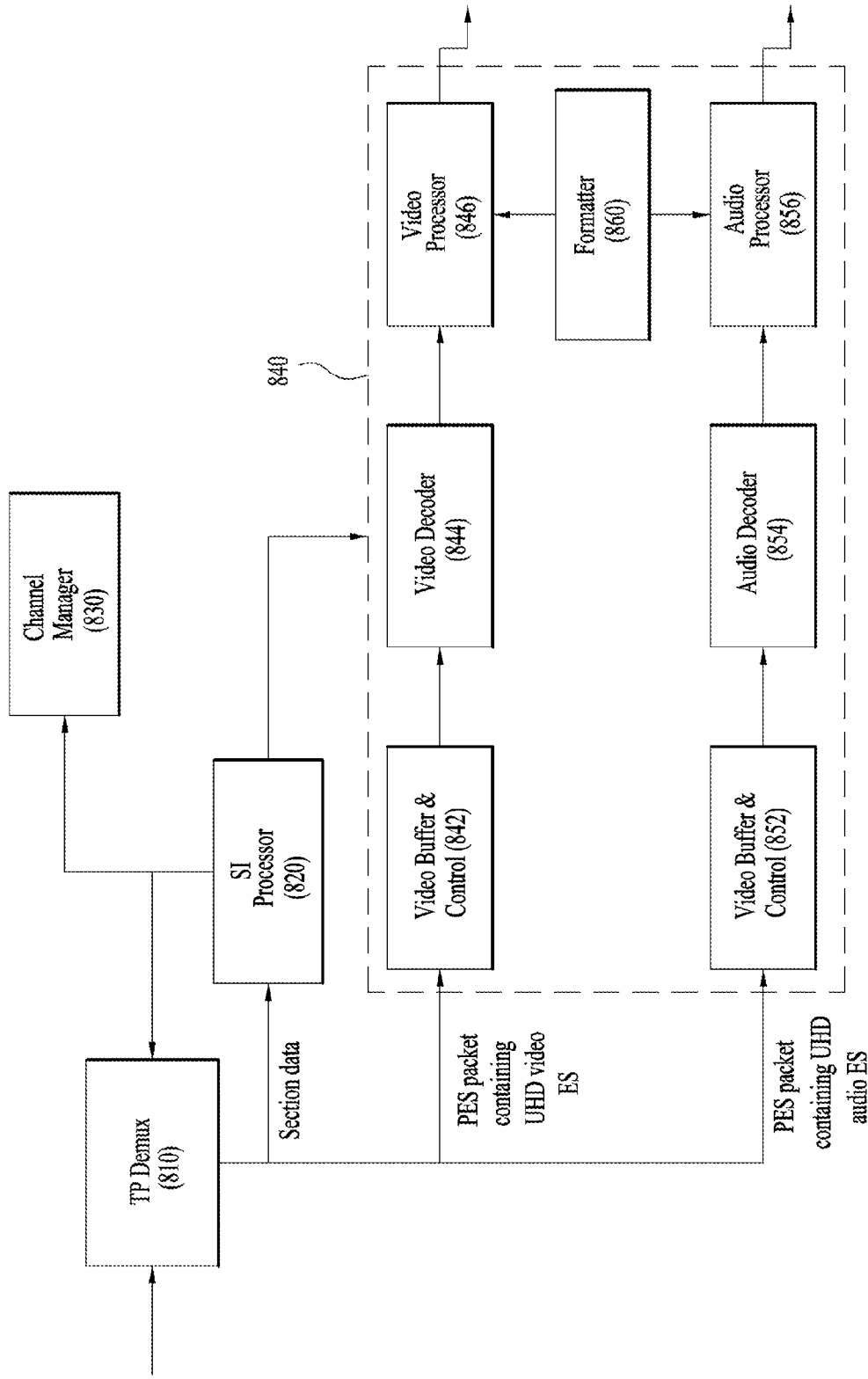
FIG. 8 is a block diagram illustrating a receiver processing UHD service according to one embodiment of a present invention.

FIG. 8 is a block diagram illustrating a receiver processing UHD service according to one embodiment of a present invention.

Referring to FIG. 8, a receiver includes a receiving unit (not shown), a demultiplexer 810, an SI processor 820, a channel manager 830 and a signal processing unit 840.

The receiving unit can include a tuner configured to receive a signal via a specific tuned channel and a demodulator configured to demodulate the received signal in response to a modulation scheme. In this case, for instance, the receiving unit may further include a network interface unit to receive UHD service data via an IP.

The demultiplexer 810 demultiplexes signaling data, video data and audio data necessary for identifying channel information via PID filtering and the like. The multiplexed signaling data is transmitted to the SI processing unit 820 and the demultiplexed audio/video data is transmitted to the signal processing unit 840.

The SI processor 820 receives section data for signaling data of a transmitting end used for implementing UHD service and processes the section data. Although it is not depicted, the SI processor can store the processed section data in a database connected to internal and external. Meanwhile, the SI processor 820 transmits channel information of the signaling data to the channel manager 830 to generate a channel map. The channel manager 830 generates a channel map based on the received channel-related signaling data and gets involved in tuning of the receiver, a channel approach and the like. The signaling data includes the aforementioned signaling data defined by a related standard such as MPEG PSI, ATSC PSIP, DVB-SI, DTMB/CMMB and the like.

The signal processing unit 840 includes a video processing unit and an audio processing unit.

The video processing unit includes a video buffer/controller 842, a video decoder 844 and a video processor 846. The video buffer/controller 842 receives UHD video data demultiplexed by the demultiplexer 810, temporarily stores the UHD video and outputs the UHD video to the video decoder 844 using a First Input First Output (FIFO) or Multi Input Multi Output (MIMO) scheme. The video decoder 844 decodes the received UHD video using a decoding scheme corresponding to an encoding scheme. The video processor 846 receives the decoded video data and performs a necessary processing to transmit the video data to the display unit or a connected display device.

The audio processing unit includes an audio buffer/controller 852, an audio decoder 854 and an audio processor 846. The audio buffer/controller 842 receives audio data for UHD video data demultiplexed by the demultiplexer 810, temporarily stores the audio data and outputs the audio data to the audio decoder 854 using a FIFO or MIMO scheme. The audio decoder 854 decodes the received audio data using a decoding scheme corresponding to an encoding scheme. The audio processor 856 receives the decoded audio data and performs a necessary processing to output the audio data via an internal or an external speaker in a manner of matching synchronization of the audio data to the video data.

The formatter 860 controls an operation of the video processor 846 and an operation of the audio processor 856. For instance, the formatter 860 delivers a signal, which performs or controls a 3D format job according to sync between video data and audio data and an output frequency of the output unit, to the video processor 846 and/or the audio processor 856 for UHD service.

Figure 9:
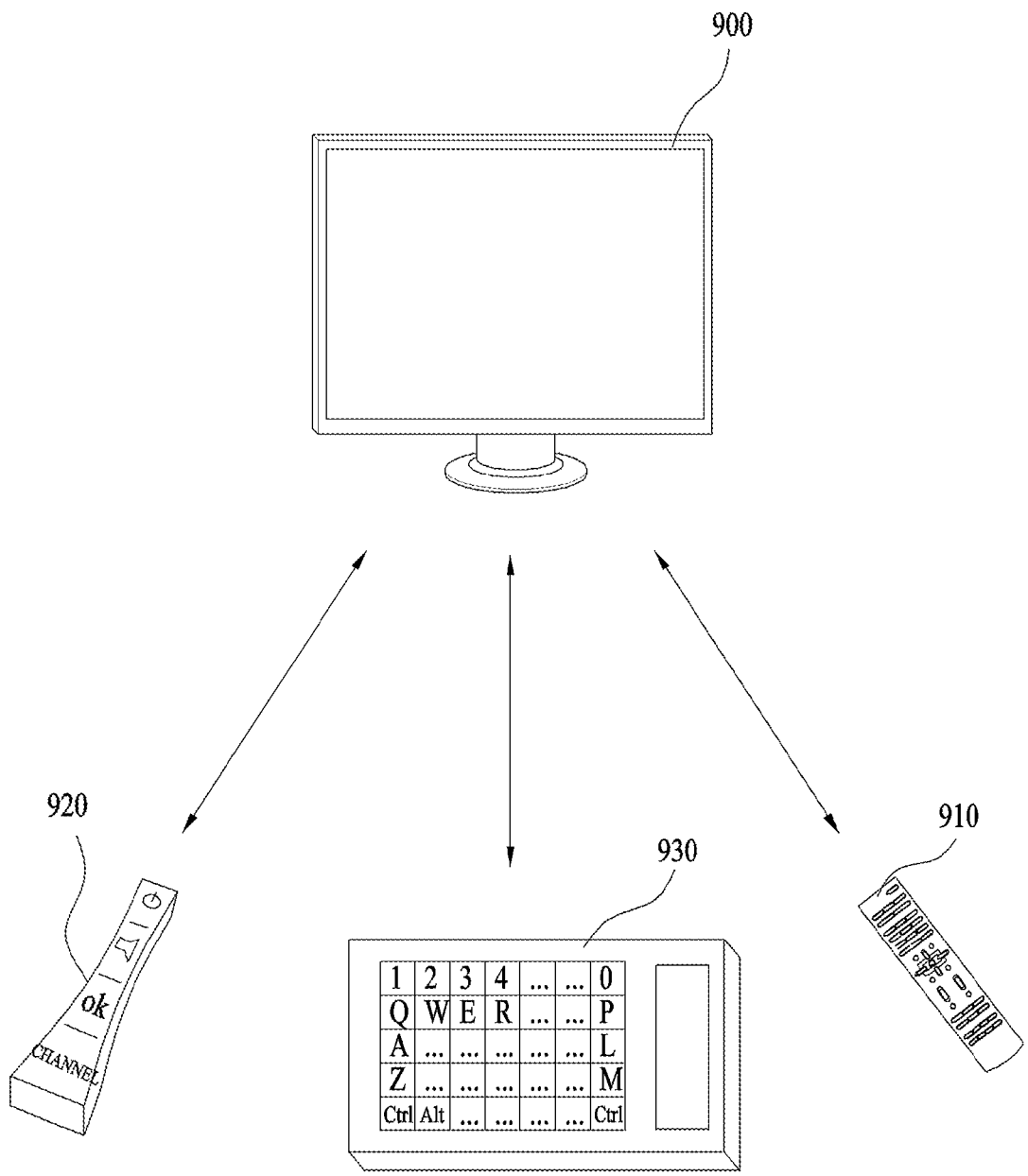
FIG. 9 is a diagram illustrating a controlling means of a digital device according to one embodiment of the present invention.

FIG. 9 is a diagram illustrating a controlling means of a digital device according to one embodiment of the present invention.

To execute various operations for implementing the present invention according to embodiments, various user interface devices (UIDs) which can communicate with a digital receiver 900 in a wired/wireless manner can be used as remote controllers.

UIDs can include a mobile device (e.g., a smart phone, a tablet PC, and the like), a magic remote controller 920 and a remote controller 930 equipped with a keyboard and a touch pad in addition to a general remote controller 910.

The remote controllers can use various communication protocols such as Bluetooth, RFID, IrDA, UWB, ZigBee, DLNA, etc.

The magic remote controller 920 may include a gyro sensor mounted therein to sense vibration of a user's hand or rotation. That is, the magic remote controller 920 can move a pointer according to up, down, left and right motions of the user such that the user can easily execute a desired action, for example, easily control a channel or a menu.

The remote controller 930 including the keyboard and touch pad can facilitate text input through the keyboard and control of movement of a pointer and magnification and reduction of a picture or video through the touch pad.

The keyboard 930 have been implemented so that it is similar to a keyboard of a PC in order to conveniently input text because the traditional remote control 910 is not sufficient enough to control the digital device 900 since the digital device 900 offers more than just providing broadcast programs as it did before, but has advanced into a intelligent integrated digital device providing web browser, application, social network service (SNS) and the like.

Meanwhile, the control means such as the remote control 910, the pointing device 920, and the keyboard 930 can, if necessary, include a touchpad to control functions of text input, move the pointer, enlarging/reducing pictures and video clips more conveniently.

The digital device described in the present specification uses Web OS as a platform. Hereinafter, a Web OS based process or algorithm may be performed by the controller of the above-described digital device. The controller includes the controllers of FIGS. 4 to 8 and has wide concepts. Accordingly, hereinafter, a component for processing Web OS based services, applications, content, etc., including software, firmware or hardware in a digital device is referred to a controller.

Such a Web OS based platform may improve development independency and functional extensibility by integrating services, applications, etc. based on a Luna-service bus, for example, and increase application development productivity based on web application framework. In addition, system resources, etc. may be efficiently used via a webOSWeb OS process and resource management to support multitasking.

A Web OS platform described in the present specification may be available not only for stationary devices such as personal computers (PCs), TVs and set top boxes (STBs) but also for mobile devices such as cellular phones, smartphones tablet PCs, laptops, and wearable devices.

A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

In the following, various embodiments according to the present invention are explained with reference to attached drawings.

As mentioned in the foregoing description, the present disclosure can provide a user with a device configuration used for servicing such UHD service as 4K, 8K and the like as well as legacy FHD TV service via a single TV, all UHD services in a single device irrespective of a type of inputted UHD service and a device equipped with flexibility capable of providing such UHD service as 4K, 8K and the like according to an input source and a user selection. Moreover, the present disclosure can provide a user with a device supporting UHD service adaptive to such a design convenience as a chip, a hardware, a software platform and the like and a user request by simply securing expandability from a device supporting 4K UHD service to a device supporting 8K UHD service.

As mentioned in the foregoing description, currently discussed UHD service includes 4K and 8K. Yet, according to advancement of technologies and a demand of a market, UHD service of more clear and high quality will be required. Currently, although a manufacturer manufactures a digital device processing 4k-dedicated or 8k-dedicated UHD service, since a service environment is continuously changing according to an environmental change of a market, a standard definition, a demand and the like, flexibility of the 4k-dedicated or the 8k-dedicated UHD service is decreasing in terms of cost and efficiency.

In the following, the present disclosure intends to propose a structure and a method capable of processing not only 8k but also UHD service more advanced than the 8k in a manner of applying a 4k UHD service processing configuration.

Figure 10:
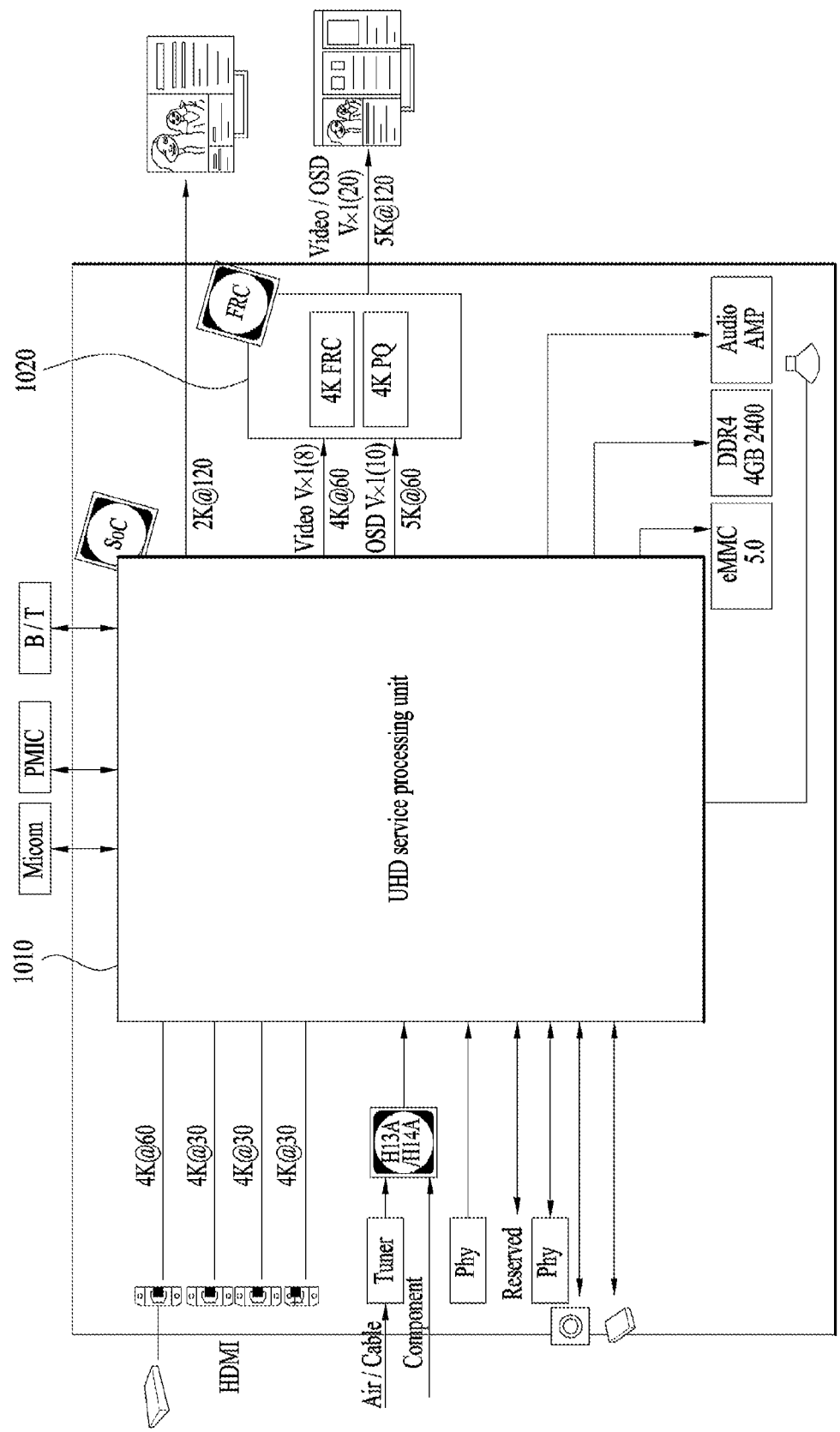
FIG. 10 is a block diagram illustrating 4k UHD service processing configuration according to one embodiment of the present invention.

FIG. 10 is a block diagram illustrating 4k UHD service processing configuration according to one embodiment of the present invention.

In this case, 4k UHD service, i.e., an input source can be transmitted via various paths.

For instance, a plurality of interfaces configured to deliver an input source are shown at the left of FIG. 10. The input source may include such an external input as HDMI and such a media as Air, a cable, an IP and the like.

A UHD service processing unit 1010 is equipped with a necessary interface to receive service from the aforementioned input sources. The interface may include a HDMI terminal, a tuner, a network interface and the like.

If service is received from an input source, a digital device identifies the service and performs an appropriate processing on the identified service via the aforementioned demodulation unit, the demultiplexer, the SI processing unit, a decoder and the like. The processed service data is outputted via the output unit.

In this case, if the identified inputted service corresponds to a 2k (i.e., FHD service); the digital device immediately outputs FHD service data using the output unit via the decoder of the UHD service processing unit 1010.

Yet, if the identified inputted service corresponds to 4k or 8k UHD service, it is difficult for the output unit to output UHD service using processing of the UHD service processing unit 1010 only. Hence, if identified service data corresponds to UHD service, service data went through the UHD service processing unit 1010 is reprocessed by a FRC 1020 and the reprocessed service data is provided to a user via the output unit.

To this end, it is important for the digital device to identify whether inputted service corresponds to UHD service. And, if the digital device identifies that an inputted service corresponds to UHD service, it is additionally necessary for the digital device to identify whether the identified UHD service corresponds to 4k or 8k.

This can be known by parsing of signaling data which is transmitted together with the inputted service. In this case, the signaling data can be defined in various forms according to an input source and can be delivered to a receiver. When the receiver appropriately processes the signaling data, the input source can be processed properly.

FIGS. 11 to 14 are diagrams illustrating signaling data used for processing UHD service according to embodiments of a present invention.

In this case, in case of providing UHD service via a broadcast station such as a terrestrial or a cable, the present disclosure explains an example of signaling data which is defined to process the UHD service. Meanwhile, the signaling data is explained with an embodiment of PSI/PSIP data used in an ATSC system, by which the present invention may be non-limited. In order to help understand the present invention and for clarity of explanation, the signaling data is defined in a table form mainly used by the system.

First of all, a plurality of signaling data in a table form exist in PSI. For instance, a Program Association Table (PAT), a Program Map Table (PMT) and the like may be associated with the present invention. For clarity, the PMT is shown in FIG. 11 as an example.

In the following, according to the signaling data defined in a table form shown in FIGS. 12 to 14 as well as FIG. 11, necessary data is defined according to a predetermined field form. Yet, all fields included in a table are explained based on content defined by a standard document and the like and detail explanation on all fields is omitted at this time. Instead, fields related to the present invention, a definition of the fields or a use of the fields is briefly described.

Meanwhile, according to one embodiment of the present invention, legacy signaling data is used as it is and data related to UHD service is defined in a descriptor form.

The PMT shown in FIG. 11 can define service data of a program unit and service data of an elementary stream (ES) unit. For instance, it is able to define whether service of a program unit corresponds to UHD service in a manner of newly defining a descriptor belonging to a loop structure appearing after a program_infor_length field or defining a value of a legacy descriptor. In case of parsing the newly defined descriptor or the value of the legacy descriptor by a receiver, it is able to identify whether a corresponding program corresponds to a program for UHD service. In this case, if the program corresponds to a program used for the UHD service, the descriptor can be defined to identify up to 4k or 8k UHD service if necessary.

Meanwhile, signaling data can be defined by an ES unit in a descriptor belonging to a loop appearing after an ES_info_length field. In this case, the descriptor is defined to identify whether a corresponding ES corresponds to an ES used for UHD video service. And, the descriptor is defined to make a receiver know whether the corresponding ES corresponds to the ES used for the UHD video service. In this case, if the corresponding video ES corresponds to a video ES used for the UHD video service, the descriptor can be defined to additionally identify 4k or an 8k UHD service if necessary.

FIGS. 12 and 13 show a Virtual Channel Table (VCT) and an Event Information Table (EIT), respectively, among PSIP data. In this case, the VCT defines channel information on a virtual channel and the EIT defines information on an event belonging to the defined virtual channel.

First of all, referring to FIG. 12, the VCT is connected to the aforementioned PMT via a program_number field and it is able to define whether service transmitted via a corresponding virtual channel corresponds to UHD service in a service_type field. In this case, it is also able to define whether service transmitted via the corresponding virtual channel corresponds to a 4k or an 8k in the service_type field. Or, as mentioned earlier in the PMT of FIG. 11, it is able to define whether service corresponds to UHD service by a form of a descriptor belonging to the VCT and the descriptor can be delivered to a receiver to make the receiver know whether the service corresponds to the UHD service.

Meanwhile, referring to FIG. 13, in EIT, a specific virtual channel identified by the VCT is connected via a source_id field and it is able to identify whether an event delivered via the virtual channel corresponds to an event used for UHD service in the EIT. In this case, similar to FIG. 11, it is able to define whether an event corresponds to UHD service by a form of a descriptor belonging to the EIT. If the event corresponds to an event used for the UHD service, the descriptor can be defined to identify 4k and 8k.

Lastly, referring to FIG. 14, an SEI message is defined. For instance, the SEI message corresponds to signaling data which is delivered in a manner of being included in a header of video data. The SEI message is little bit different from a processing path of the aforementioned signaling data. For instance, the signaling data mentioned earlier in FIG. 11 to FIG. 13 is received via a tuner or a cable, firstly filtered by a demultiplexer, processed by an SI decoder and used by a video decoder to process corresponding video data. On the contrary, since the SEI message is included in a header of video data itself, the SEI message is parsed by a video decoder and can be immediately used. Hence, it is able to identify whether decoded video data corresponds to FHD video data or UHD video data via the SEI message. In some cases, if decoded video data corresponds to UHD video data, the SEI message can identify whether the decoded video data corresponds to 4k or 8k.

As mentioned in the foregoing description, signaling data corresponds to data necessary for properly processing an input source. The signaling data is also necessary to properly correspond to a future user request.

As mentioned in the foregoing description, signaling data defines at least one or more information described in the following and should be provided between transmitting end and a receiving end. A table and a descriptor used for the following information may use a value predetermined for a previously existed table and a descriptor as it is. Or, a new value can be defined for the table and the descriptor used for the following information. It may also define a new table and a new descriptor.

First of all, first information also includes a signal including UHD service data i.e., information used for identifying a stream type of a TS.

Second information corresponds to information used for identifying whether transmitted service corresponds to UHD service.

Based on the second information, if the transmitted service corresponds to UHD service, third information corresponds to information used for identifying whether the UHD service corresponds to 4k service or 8k service.

Fourth information corresponds to information used for identifying a transmission scheme of UHD service data based on the first to the third information.

As mentioned in the foregoing description, first information identifies whether a signal, i.e., a corresponding stream in a TS corresponds to a video stream. The first information can be identified via a stream_type field in the PMT mentioned earlier in FIG. 11. Hence, a receiver identifies whether a stream corresponds to a video stream in an ES unit and can decode the stream via a video decoder. In this case, the stream_type field in the PMT includes a value predetermined for each stream. Hence, according to the present invention, a video stream including UHD service can be signaled using the predetermined value or can be signaled in a manner of defining a new value. This is because UHD service according to the present invention is encoded using a HEVC codec, which is not defined in advance in a current MPEG PMT stream_type field.

The aforementioned first information is related to content on identification of a signal. On the contrary, second information is used for identifying service included in the identified signal. Regarding a service type, current related standards define the service type in various ways. Although legacy related standards define the service type via a table and/or a descriptor for service signaling, a service type for UHD service is not defined yet. Hence, it may be difficult for a receiver to identify UHD service. Hence, it is required for related standards to define a service type for UHD service.

Meanwhile, if the UHD service type signaling data is defined by a DVB scheme, the signaling data can be defined by a descriptor form related to Network Information Table (NIT), Service Description Table (SDT), Event Information Table (EIT) and the like. For instance, various values are defined and identified for components constructing service by defining a component_ descriptor in DVB-SI. In case of UHD service according to the present invention, the UHD service is appropriately identified in a manner of defining a stream_content field value and a component_type field value. Moreover, a DVB subtitle for the identified UHD service can be identified as well.

Third information identifies whether corresponding UHD service corresponds to 4k service or 8k service according to the UHD service identified by the second information. Meanwhile, the third information can be identified by the second information in advance for example. In this case, the third information may not be separately defined. For instance, the third information may be defined by a program belonging to the PMT mentioned earlier in FIG. 11 or a descriptor of an ES level in a PSI scheme. The third information can be defined using a source_id or a service_ type field information of the VCT mentioned earlier in FIG. 12, the EIT mentioned earlier in FIG. 13 and the like in a PSIP scheme.

The third information can be defined by at least one field selected from the group consisting of a network_id, a transport_stream_id and an original_network_id of NIT, a descriptor belonging to the NIT, at least one field selected from the group consisting of a transport_stream_id, an original_network_id and a service_id of SDT, a descriptor belonging to the SDT, a service_id, a transport_stream_id, and an original_network_id of EIT, a descriptor belonging to the EIT or the like. Meanwhile, the third information can make a link between identified UHD services. For instance, the third information can define different UHD service related to UHD service in an opposite way using a linkage_descriptor and an extended_linkage_descriptor in DVB-SI.

Fourth information corresponds to information used for identifying a transmission scheme of UHD service data based on the first to the third information. For instance, the fourth information can be defined by a scheme identical to that of the third information, i.e., PAT and PMT of the PSI, MGT, VCT and EIT of the PSIP, NIT, SDT and EIT of the DVB-SI, or descriptors belonging to the tables. Or, the fourth information can be defined by totally new UHD service transmission table or a descriptor. The fourth information can include at least one or more fields described in the following. A num_linked_media field can indicate the number of linked media provided by not only a current delivery media but also different service or a media to implement an original UHD broadcast. A linked_media_type field can indicate a type of a linked media. If the linked_media_type field corresponds to '00', it may indicate that linked information of a current program (service) is transmitted via different service, a channel or a program among an identical broadcast transmission media. If the linked_media_type field corresponds to 01, it may indicate that linked information of a current program is transmitted via such a different transmission media as the internet. A linked_media_sync_type field indicates a method of being obtained and synchronized of UHD service, which is to be connected to a receiver.

In relation to UHD service, one of scenarios of signaling data is described in the following. In case of delivering a linked stream included in a UHD stream via an identical media (linked_media_type=='0'), it may include a linked_UHD_sub_service_type, an associate_service_TSID and an associated_service_id. In case of delivering a linked stream included in a UHD stream via a different media (linked_media_type=='1'), it may include a linked_UHD_sub_service_type and an Internet_linkage_information ( ).

Besides, signaling data related to UHD service can further include at least one or more fields among fields described in the following in the first to the fourth information or newly defined information. An associated_service_TSID field can indicate a transport_stream_id value for a program including a stream, which is to be combined with a program described by a descriptor, to provide complete UHD service. An associated_service_original_network_id field can indicate an original_network_id value of service including a stream, which is to be combined with a program described by a descriptor, to provide complete UHD service. An associated_service_id field can indicate a service_id value of service including a stream, which is to be combined with a program described by a descriptor, to provide complete UHD service. Besides the service_id, it may include a linked_program_number field using a similar scheme.

In this case, the linked_program_number field has a meaning similar to a meaning of the program_number field of the PMT. The linked_program_number field identifies a program number for a stream capable of being combined. An internet_linkage_information field indicates connection information of the internet, which is connected to provide a complete UHD program. The internet_linkage_information field can include at least one selected from the group consisting of (1) information on whether IP address information corresponds to 32 bits or 128 bits, (2) IR address information, (3) port number information, (4) additional information such as an URI (uniform resource identifier) for an additional stream and (5) an available time slot (e.g., start time for service transmission, expiration time and the like).

Meanwhile, signaling data can further include at least one or more fields described in the following.

The signaling data can include an UHD_service_type field. The UHD_service_type field can indicate a type of sub service capable of being supported by service according to a currently described stream only. For instance, if the UHD_service_type field corresponds to 000, it may indicate that there is no stream capable of being independently outputted in current service. In particular, the UHD_service_type field can indicate that there exist a non-compatible stream only in a currently described stream and it is able to receive additional data via different service or a media except the currently described service (program) for UHD service. If the UHD_service_type field corresponds to 001, it may indicate that a HD compatible stream is included in a currently described UHD service but 4K UHD or 8K UHD service is not able to be independently supported. Hence, it may indicate that additional data can be received via different service or a media except the data provided by currently described service (program) for UHD service. If the UHD_service_type field corresponds to 010, it may indicate that a 4K UHD compatible stream is included in a currently described UHD service but HD or 8K UHD service cannot be independently supported. Hence, it may indicate that additional data can be received via different service or a media except the data provided by currently described service (program) for UHD service. If the UHD_service_type field corresponds to '011', it may indicate that all streams necessary for supporting an original UHD broadcast are included in currently described UHD service. In this case, the original UHD broadcast indicates a UHD broadcast corresponding to an original_UHD_resolution value. In this case, if the original_UHD_resolution field corresponds to '00', it may indicate a 4k UHD of a 3840*2160 resolution. If the original_UHD_resolution field corresponds to '01', it may indicate an 8k UHD of a 7680*4320 resolution. Although it is not described here, a screen format of a 4096*2160 resolution can also be signaled by a value of the original_UHD_resolution field. In doing so, it may additionally use crop rectangular-related parameters (frame_crop_left_offset, frame_crop_right_offset, frame_crop_top_offset, frame_crop_bottom_offset and the like) in an encoding process of a corresponding stream for HD compatibility. In this case, a video decoder may use a method of setting output data to 1920*1080, a method of configuring an HD compatible video signal using bar data and the like. The signaling data can include a linked_media_sync_type field. The linked_media_sync_type field corresponds to a field describing a method of obtaining a linked UHD video. As shown in an example, a sub stream or a sub video may become a video component for UHD service. And, the sub stream or the sub video can be transmitted using one or more broadcast channels or can be transmitted via a physical media different from the one or more broadcast channels. For instance, a first sub stream is transmitted on a terrestrial broadcast channel and a second, a third and a fourth sub stream can be transmitted via an IP stream of the internet. Hence, in case of transmitting video components transmitted via transmission means different from each other, the linked_media_sync_type field can signal a synchronization method for the video components. Hence, a synchronous delivery indicates a case of transmitting two or more components in real time. In this case, the two or more components are expressed in a receiver in a manner of being synchronized. On the contrary, an asynchronous delivery indicates a case of transmitting a component in non-real time. In this case, a receiver stores a first component in advance, receives a different component transmitted after the first component is stored and expresses the first and the different component in a manner of synchronizing the components with each other. For instance, if the linked_media_sync_type field corresponds to '000', it indicates that the synchronous UHD delivery is available only for linked UHD sub streams (services). Hence, in this case, the linked UHD sub streams can be expressed as UHD service in a manner of being transmitted in real time and being synchronized with each other. If the linked_media_sync_type field corresponds to '001', it may indicate that the asynchronous delivery is available for linked UM sub frames (services) and the UHD sub streams referenced by link information (e.g., associated_service_TSID, associated_service_original_network_id, associated_service_id, internet_linkage_information and the like) are transmitted later. Hence, in this case, the linked UHD sub frames are transmitted in non-real time. Having received link information, a receiver can express UHD service in a manner of synchronizing the UHD sub frames, which are transmitted in non-real time, with each other. If the linked_media_sync_type field corresponds to 010, it may indicate that the asynchronous delivery is available for linked UHD sub frames and the UHD sub streams referenced by link information (e.g., associated_service_TSID, associated_service_original_network_id, associated_service_id, internet_linkage_information and the like) are already transmitted. Hence, in this case, the linked UHD sub frames are already transmitted in non-real time. A receiver can express UHD service in a manner of synchronizing the UHD sub frames, which are transmitted on timing different from each other, with each other using link information. If the linked_media_sync_type field corresponds to '011', it may indicate that both the synchronous UHD delivery and the asynchronous delivery are available for linked UHD sub frames and the UHD sub streams referenced by link information (e.g., associated_service_TSID, associated_service_original_network_id, associated_service_id, internet_linkage_information and the like) will be transmitted again in the future or the UHD sub streams referenced by the link information are transmitted with a current event at the same time. If the linked_media_sync_type field corresponds to 100, it may indicate that both the synchronous UHD delivery and the asynchronous delivery are available for linked UHD sub streams and the UHD sub streams referenced by link information (e.g., associated_service_TSID, associated_service_original_network_id, associated_service_id, internet_linkage_information and the like) are already transmitted and the UHD sub streams referenced by the link information are transmitted with a current event at the same time. A sub stream descriptor can include a descriptor according to each stream. Yet, in this case, although information on compatibility and a sampling factor of each stream is able to know, it is unable to know information on a whole composition of an original UHD broadcast. Hence, in order to provide a UHD broadcast, it is able to signal information on a whole composition of a UHDTV broadcast provided by program/channel/service level. The information on the whole composition of the UHDTV broadcast may include the number of component streams, channel/service information in which each stream is included, information on whether each stream is transmitted in real time or non-real time and the like. Regarding this, it shall be described in a combine descriptor. Since an operation of a receiver varies according to whether UHD sub-services provided by each channel are synchronized with each other, the present invention explains signaling in consideration of the operation of the receiver which is differentiated according to whether UHD sub-services provided by each channel are synchronized with each other. In particular, if all UHD sub-services are synchronized with each other, the UHD sub-services can be immediately outputted in real time at the time of receiving the UHD sub-services. Or, if the UHD sub-services are asynchronously configured, a part or all of the UHD sub-services are stored in a receiving end and the UHD sub-services can be outputted in a manner of being combined with components, which are received later.

A header of a video ES may have a format of a Supplemental Enhancement Information (SEI) message described in FIG. 14.

FIG. 14 illustrates an example of an SEI payload format of a video ES. If a payload type of an SEI payload corresponds to 5, it may have a payload format according to a user_data_registered_itu_t_t35 ( ).

In this case, a user_identifier field may have a value of '0x4741 3934' and a user_structure may have a form described in the following. If a user_data_type_code corresponds to '0x1B', a user_data_type_structure ( ) may include information of a UHD_sampling_info, which describes a sub stream according to a scheme of sub sampling a UHD video.

As a form of an SEI message of a video ES, if a palyloadType of the SEI message corresponds to 37, sampling information (UHD_sampling_info) can be included.

Figure 15:
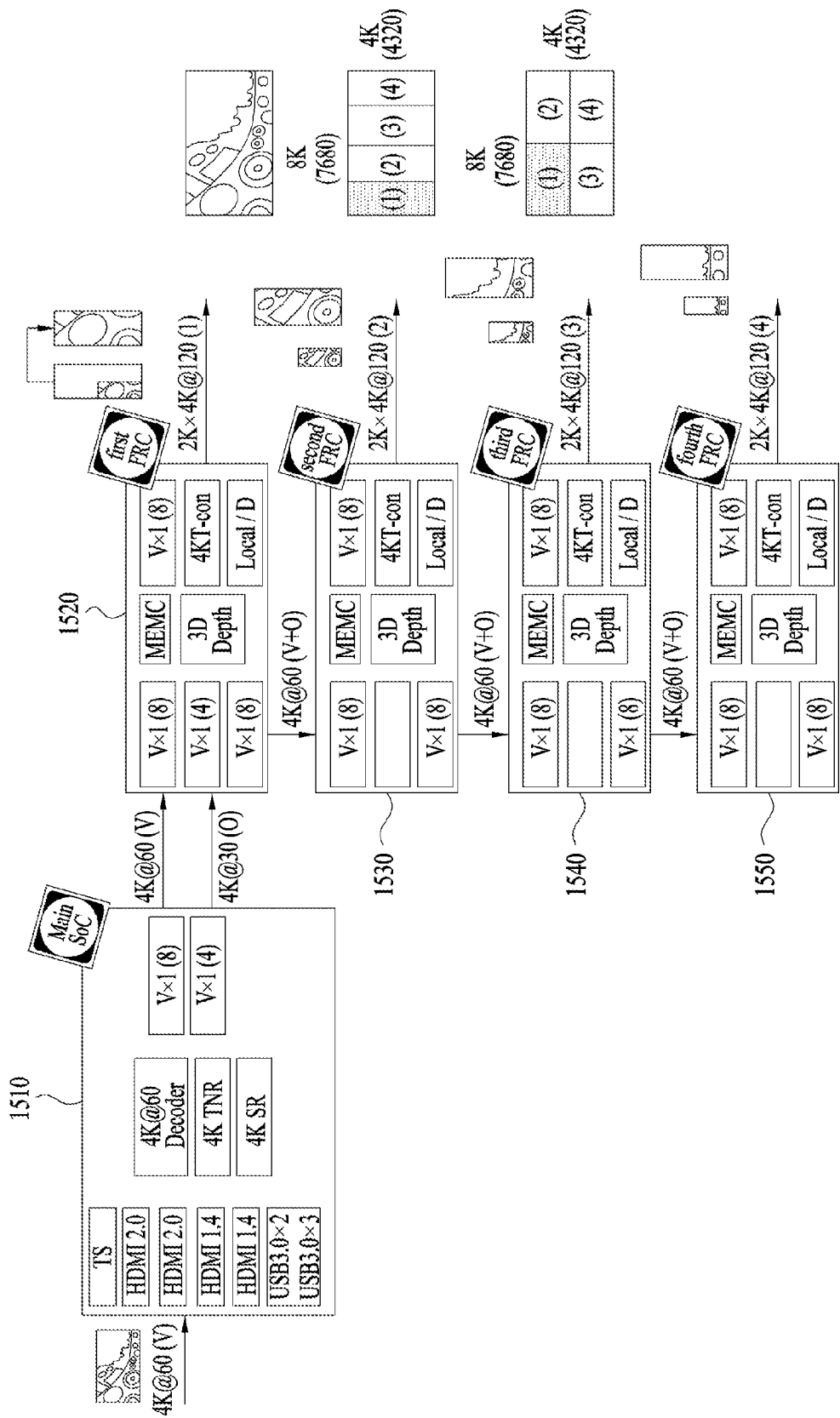
FIG. 15 is a block diagram illustrating a configuration used for processing 8k UHD service via 4k UHD service processing configuration according to one embodiment of the present invention.

FIG. 15 is a block diagram illustrating a configuration used for processing 8k UHD service via 4k UHD service processing configuration according to one embodiment of the present invention.

Referring to FIG. 15, an inputted signal corresponds to UHD video data of 4k 60 Hz. As shown in FIG. 15, the signal can be received via a terrestrial or a cable or can be inputted via a HDMI interface or a USB.

The inputted UHD video data of 4k 60 Hz is processed by a main SoC 1510 including UHD service processing unit with 4k 60 Hz and is delivered to a FRC processing unit via an output unit.

In this case, the FRC processing unit according to the present invention may have a single FRC structure or a multi FRC structures. FIG. 15 shows the multi FRC structures. In this case, if inputted data corresponds to UHD video data of 4k 60 Hz, the inputted data can be processed by such a single FRC as the single FRC structure only.

Each FRC includes an input interface unit, an output interface unit, an MEMC, a 4K T-con and the like.

In this case, the input interface unit corresponds to a component configured to receive a source from the UHD service processing unit (main SoC) 1510, the output interface unit corresponds to a component configured to deliver processed UHD video data to the output unit. Meanwhile, if a user request or input data is identified as 8k UHD video data, the input interface plays a role of delivering the user request or the input data to a next FRC.

Meanwhile, the input interface unit receives not only 4k or 8k UHD video data but also OSD data. In this case, the OSD data has a format identical to a format of inputted data. In particular, if the inputted data corresponds to UHD video data of 4k 60 Hz, the OSD data may become OSD data of 4k 30 Hz to enable the OSD data to be outputted according to the inputted data.

The MEMC unit MEMC processes the inputted 4k 60 Hz UHD video data and the 4k 30 Hz ODS data.

The 4k T-con performs variable processing on the MEMC processed video data and the OSD data to change the data to 8k 120 Hz.

A multi FRC consisting of N number of FRCs is explained as an example. In order to help understand the present invention and for clarity of explanation, the present disclosure explains a multi-FRC consisting of 4 FRCs. Hence, the N may correspond to 4.

By a processing of a first FRC 1520, 4k 60 Hz UHD data (first area data) corresponding to ¼ of input data becomes 2k*4k 120 Hz UHD video data and this becomes first 8k 120 Hz UHD data.

By a processing of a second FRC 1530, 4k 60 Hz UHD data (second area data) corresponding to ¼ of input data becomes 2k*4k 120 Hz UHD video data and this becomes second 8k 120 Hz UHD data.

By a processing of a third FRC 1540, 4k 60 Hz UHD data (third area data) corresponding to ¼ of input data becomes 2k*4k 120 Hz UHD video data and this becomes a third 8k 120 Hz UHD data.

By a processing of a fourth FRC 1550, 4k 60 Hz UHD data (fourth area data) corresponding to ¼ of input data becomes 2k*4k 120 Hz UHD video data and this becomes fourth 8k 120 Hz UHD data.

In this case, original 4k 60 Hz UHD data is divided into areas to be processed by each FRC and the each FRC individually processes the divided areas, respectively. By doing so, the first FRC 1520 can deliver a data for a corresponding area to the second FRC 1530 after the data is processed or at the time of processing the data. The second FRC 1530 can also deliver a data to the third FRC 1540 using an identical scheme. The third FRC 1540 can also deliver a data to the fourth FRC using the identical scheme. By doing so, processing of an overlapped area can be prevented in advance.

As mentioned in the foregoing description, by collecting 8k 120 Hz UHD video data of areas, which are processed by n number of FRCs, and appropriately processing the data by a mixer or an output formatter, the output unit can output 8k 120 Hz UHD video data from 4k 60 Hz UHD video data.

Referring to FIG. 15, n number of FRCs, i.e., multi FRC structures are connected to each other with a cascade scheme.

Meanwhile, the n numbers of FRC structures appropriately process inputted UHD video data in a manner that a single or a plurality of FRCs is enabled according to input data or a user request.

For instance, if a single FRC is enabled only among the n number of FRCs, it is able to process 4k UHD video data. If two FRCs are enabled among the n number of FRCs, it is able to process UHD video data of 8k 60 Hz. If 4 FRCs are enabled among the n number of FRCs, it is able to process UHD video data of 8k 120 Hz.

Meanwhile, according to the present invention, OSD data is allocated to be appropriately processed according to a user request. If the OSD data is processed together with UHD video data by an enabled FRC, inconvenience of a user can be minimized.

Figure 16:
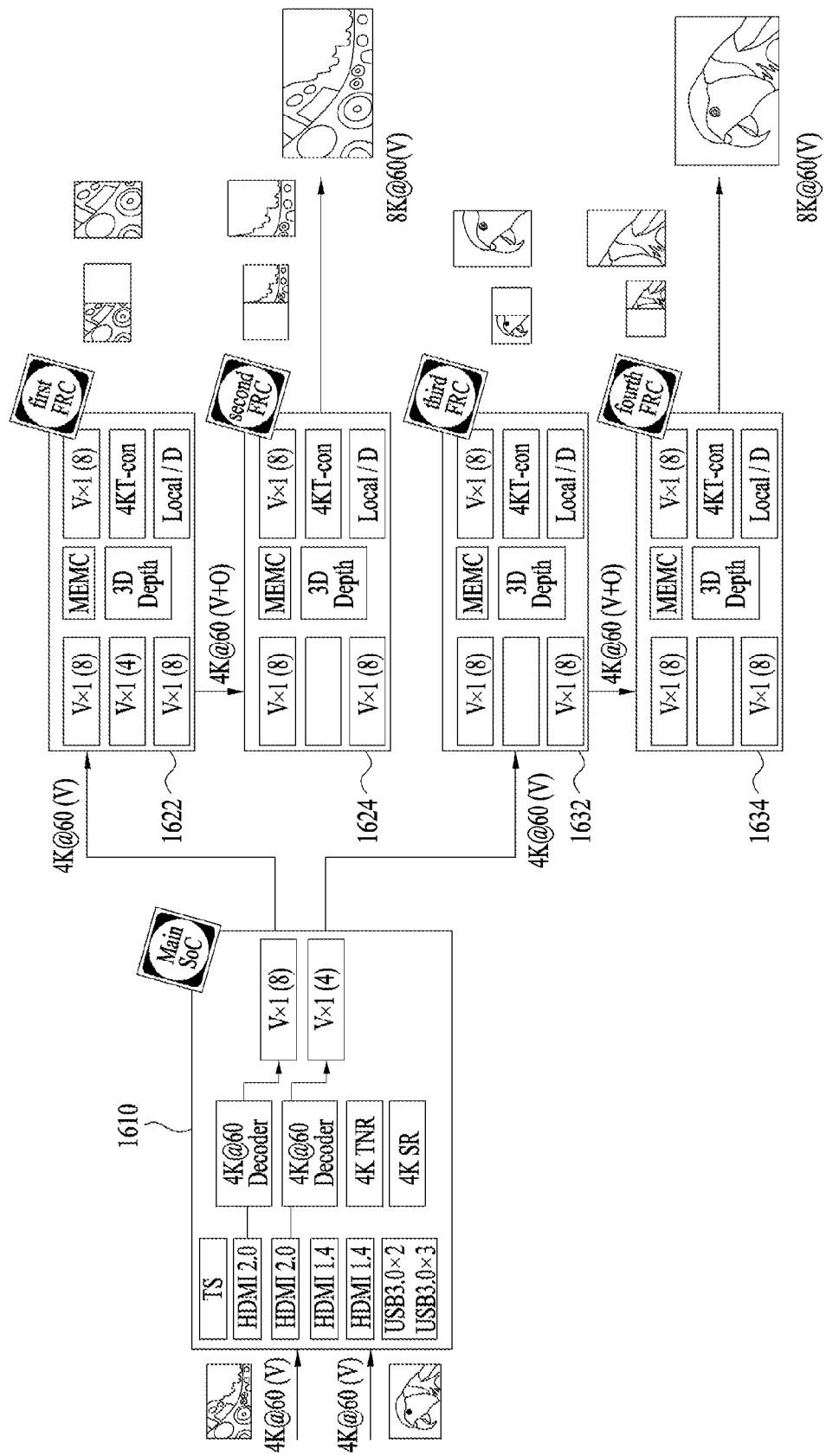
FIG. 16 is a block diagram illustrating a configuration used for processing 8k UHD service via 4k UHD service processing configuration according to another embodiment of the present invention.

FIG. 16 is a block diagram illustrating a configuration used for processing 8k UHD service via 4k UHD service processing configuration according to another embodiment of the present invention.

Unlike a single system of FIG. 15, FIG. 16 shows an implementation of a dual system. In the following, points different from points of FIG. 15 are mainly explained. Points identical or similar to the points of FIG. 15 may refer to the content mentioned earlier in FIG. 15.

In particular, referring to FIG. 16, a dual, i.e., two 4k 60 Hz UHD video data are inputted and the inputted two UHD video data are processed as 8k UHD video data, respectively.

Referring to FIG. 16, the inputted UHD video data is passing through a main SoC 1610 including a UHD processing unit. There may exist n number of FRCs. If the n corresponds to 4, two FRCs are assigned to each of the two 4k 60 Hz UHD video data, respectively. By doing so, each of outputted 8k UHD video data becomes 60 Hz. Hence, if the number of n is more increased, i.e., if the FRC is more equipped, it is natural to process 8k 120 Hz UHD video data.

Meanwhile, unlike FIG. 15, the UHD video processing unit (main SoC) 1610 of FIG. 16 is equipped with two 4k 60 Hz video decoders to process each of the two 4k 60 Hz UHD video data inputted as dual inputs. And, a different component shown in FIG. 16 may have a double of a component shown in FIG. 15.

Each of the two 4k 60 Hz UHD video data inputted as dual can be inputted on a same timing or timings different from each other via media or interfaces different from each other.

A first FRC 1622 and a second FRC 1624 process ½ area of first 4k 60 Hz UHD video data, respectively, and output single 8k 60 Hz UHD video data at last.

A third FRC 1632 and a second FRC 1634 process ½ area of second 4k 60 Hz UHD video data, respectively, and output different single 8k 60 Hz UHD video data at last.

Meanwhile, although it is not depicted, if video data included in an inputted signal corresponds to 8k UHD video data, the video data is not decoded by the UHD service processing unit. Instead, the video data is directly delivered to multi FRCs and each of the multi FRCs can appropriately process the video data.

Meanwhile, as shown in FIG. 10, in multi FRC structures, FHD video data can be processed without passing through a FRC. If inputted video data corresponds to FHD video data, the FHD video data can be variably processed into UHD video data in a manner of appropriately assigning and enabling a FRC.

Figure 17:
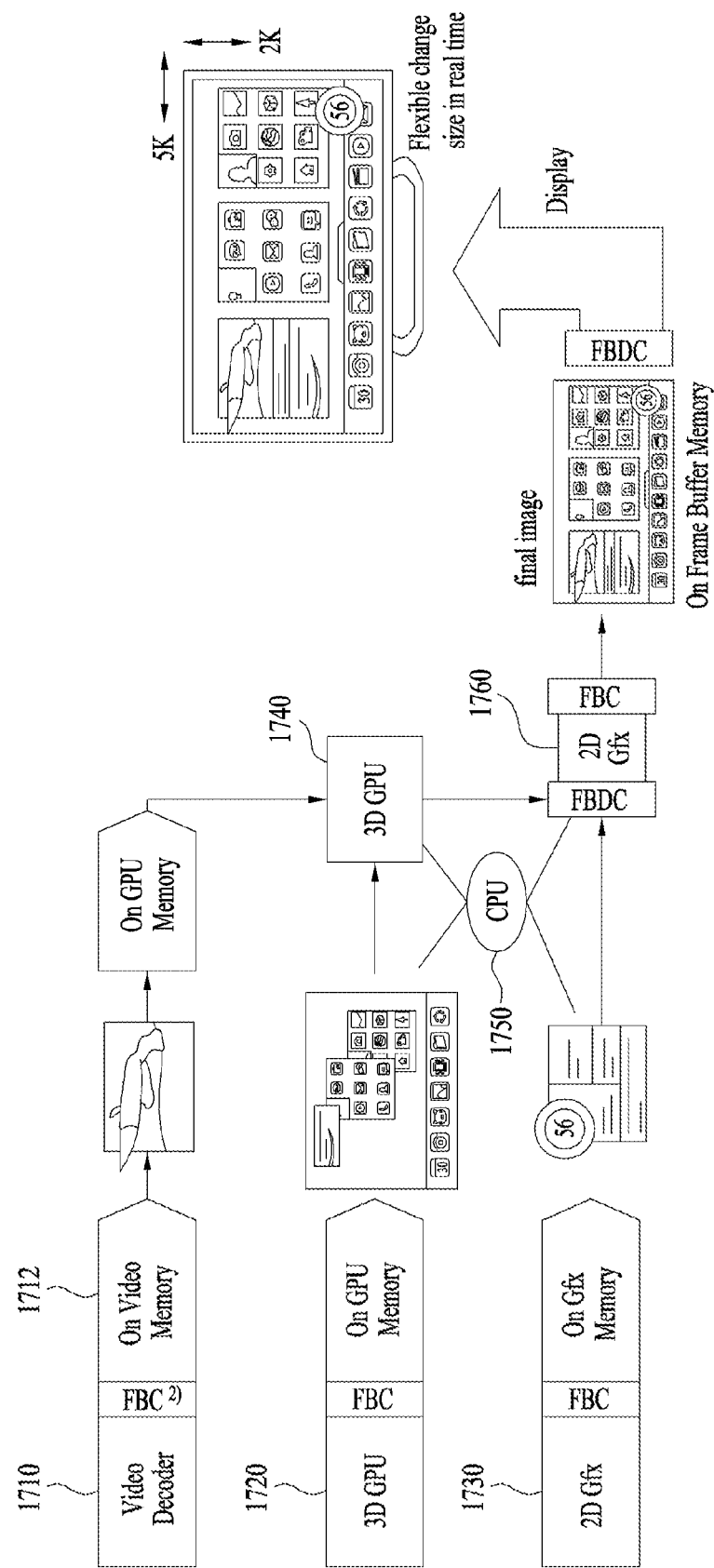
FIG. 17 is a diagram illustrating a method of providing a seamless UI in case of processing 8k UHD service via 4k UHD service processing configuration according to one embodiment of the present invention.

FIG. 17 is a diagram illustrating a method of providing a seamless UI in case of processing 8k UHD service via 4k UHD service processing configuration according to one embodiment of the present invention.

As mentioned in the foregoing description, in case of performing a variable processing on FHD or 4k UHD video data to obtain 8k UHD video data according to the present invention, it is necessary to process OSD data, an UI and the like with an identical format.

Yet, since it is not easy to seamlessly process the data using a FRC processing only, it may utilize a lossless frame buffer compression algorithm, a zero-copy operation and the like. Since the lossless frame buffer compression algorithm, the zero-copy operation and the like are schemes using contents previously known to public, detail explanation on the schemes is omitted in the present disclosure. Yet, the lossless frame buffer compression algorithm, the zero-copy operation and the like are used not for an originally defined scheme but for the present invention to provide a seamless UI.

Referring to FIG. 17, a video decoder 1710 decodes inputted UHD video data, temporarily stores the decoded UHD video data in a video memory and delivers the UHD video data to a GPU memory 1712.

A 3D GPU 1720 processes OSD data related to such an application as a home dashboard, a 3D application, a browser, a game and the like or UI data, delivers the processed OSD data or the processed UI data to a GPU memory.

A 3D GPU 1740 receives stored data from each GPU memory and delivers the data to a CPU 1750 or a 2D Gfx processing unit 1760. The CPU 1750 processes the data received from the 3D GPU 1740 and the Gfx memory. The CPU 1750 delivers the processed data to a 2D Gtx processing unit 1760.

The 2D Gfx 1730 processes such an application as Air, Multimedia and Hypermedia information coding Expert Group (MHEG), TTX, Automated Content Access Protocol (ACAP) and a home menu and temporarily stores data in a Gfx memory.

The data temporarily stored in the GPU memory is delivered to the 3D GPU 1740, the 2D Gfx processing unit 1760 performs such a processing as a final composition, rotation and a graphic effect on the data together with the data stored in the Gfx memory and a final image is formed. In this case, the final image may correspond to image data that the UHD video data, various OSDs and UI data are combined with each other.

The image data is temporarily stored in a frame buffer memory and can be sequentially outputted via the output unit.

By doing so, optimized mass production time can be reduced by securing stability of an overall system and it may also deal with a complex multi-tasking. In case of outputting UHD video data, it is able to provide a proper UI to a user, change an UI size in real time and move a position of an icon. Moreover, it is able to efficiently use a memory and increase a tasking performance of a 3D GPU.

Figure 18:
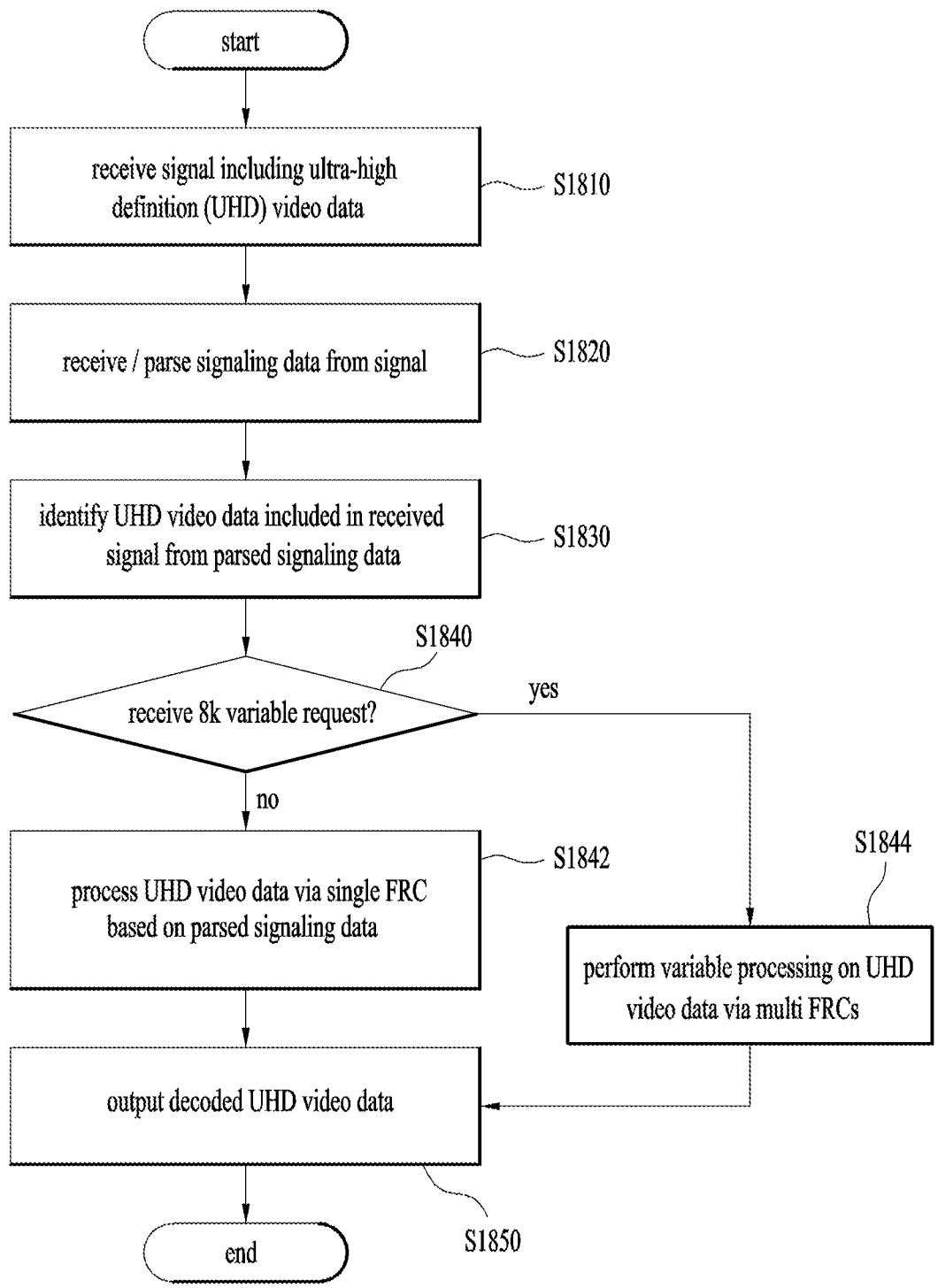
FIG. 18 is a flowchart illustrating a method of processing UHD service according to one embodiment of the present invention.
Figure 19:
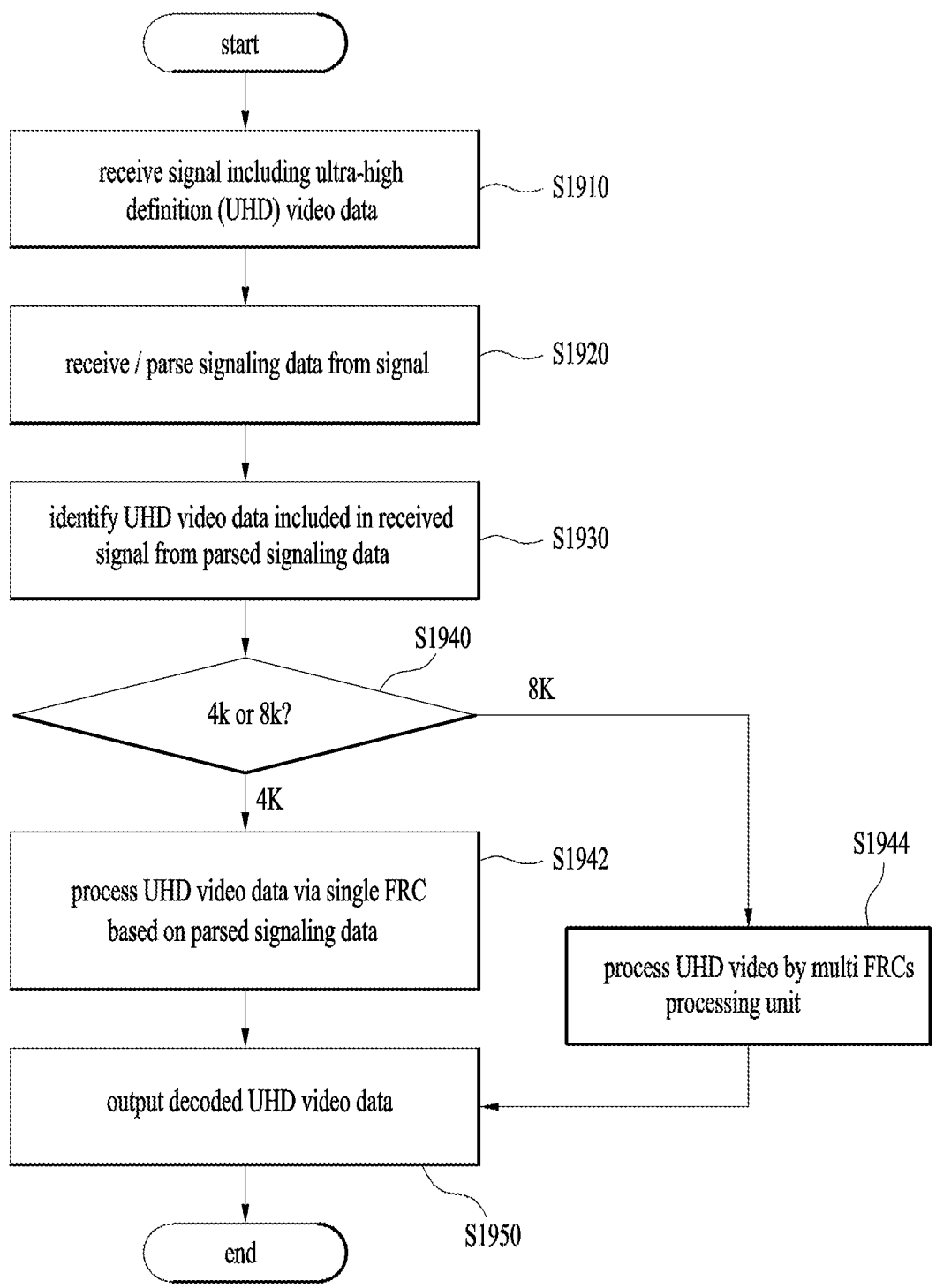
FIG. 19 is a flowchart illustrating a method of processing UHD service according to another embodiment of the present invention.

FIG. 18 is a flowchart illustrating a method of processing UHD service according to one embodiment of the present invention and FIG. 19 is a flowchart illustrating a method of processing UHD service according to another embodiment of the present invention.

Referring to FIG. 18, a digital device receives a signal including first UHD video data (4k) and signaling data used for the first UHD video data (S1810).

The digital device decodes (or parses) the signaling data from the signal (S1820) and identifies that the video data corresponds to first UHD video data from the decoded signaling data (S1830).

The digital device determines whether a variable change request for changing the identified first UHD video data to second UHD video data (8k) is received from a user (S1840).

If the variable change request of the step S1840 is not received, MID video data is decoded via a single FRC based on the parsed signaling data (S1842) and outputs the decoded 4k UHD video data (S1850).

Yet, if the variable change request of the step S1840 is received, a variable processing is performed on the 4k UHD video data via multi FRCs (S1844).

Subsequently, 8k UHD video data on which the variable processing is performed is outputted (S1850).

Referring to FIG. 19, a digital device receives a signal including first UHD video data and signaling data used for the first UHD video data (S1910).

The digital device decodes the signaling data from the signal (S1920) and identifies that the video data corresponds to UHD video data from the decoded signaling data (S1930).

The digital device determines whether the identified UHD video data corresponds to a 4k or an 8k (S1940).

As a result of the step S1940, if the identified UHD video data corresponds to the 8k UHD video data, a variable processing is performed on the identified UHD video data via multi FRCs (S1944).

Yet, as a result of the step S1940, if the identified UHD video data corresponds to the 4k UHD video data, the identified UHD video data is processed by a single FRC (S1942).

Subsequently, the 4k UHD video data processed by the single FRC in the step S1942 or the 8k UHD video data processed by the multi FRCs in the step S1944 is outputted (S1950).

In this case, the first UHD video data corresponds to 4k UHD video data and the second UHD video data corresponds to 8k UHD video data.

And, the first UHD video data can be inputted by at least one selected from the group consisting of HDMI, a terrestrial, a cable and an IP or an interface. The signaling data can include at least one selected from the group consisting of a PSI/PSIP scheme, a DVB-SI scheme, and a SEI message.

And, the variable processing can be performed via a structure of multi FRCs in a manner of including a plurality of FRC processing units to process the first UHD video data into the second UHD video data. The structure of the multi FRCs can be configured in a manner that all FRCs are connected to each other in a cascade scheme to perform the variable processing. The structure of the multi FRCs may correspond to a structure that a plurality of FRCs are connected to each other in a dual scheme to perform the variable processing. Meanwhile, if two FRCs are enabled from the structure of the multi FRCs, a variable processing can be performed on first UHD video data to output 8k 60 Hz-dedicated second UHD video data. And, if two FRCs are enabled from the structure of the multi FRCs, a variable processing can be performed on first UHD video data to output 8k 120 Hz-dedicated second UHD video data.

According to the aforementioned present invention, it is able to provide a user with a device configuration used for servicing such UHD service as 4K, 8K and the like as well as legacy FHD TV service via a single TV, all UHD services in a single device irrespective of a type of inputted UHD service and a device equipped with flexibility capable of providing such UHD service as 4K, 8K and the like according to an input source and a user selection. Moreover, the present disclosure can provide a user with a device supporting UHD service adaptive to such a design convenience as a chip, a hardware, a software platform and the like and a user request by simply securing expandability from a device supporting 4K UHD service to a device supporting 8K UHD service.

A digital device and a method of processing service thereof disclosed in the present disclosure may be non-limited to the aforementioned configurations and method of embodiments. The embodiments may be composed in a manner that a whole or a part of the each of the embodiments is selectively combined to achieve various modifications.

Meanwhile, a method of operating a digital device disclosed in the present disclosure can be implemented with a code readable by a processor in a recording media in which a program is recorded. The recording media readable by the processor includes recording devices of all types in which data readable by the processor is stored. The examples of the recording media readable by the processor may include a ROM, a RAM, a CD-ROM, a magnetic tape, a floppy disc, optical data storing device and the like. And, implementing in a form of a carrier wave (e.g., transmission via the internet) is also included. The recording media readable by the processor are distributed to the computer systems connected by a network and codes readable by the processor can be stored and executed in a manner of being distributed.

While the present disclosure has been described and illustrated herein with reference to the attached drawings thereof, the present invention may be non-limited to the aforementioned embodiments and it will be apparent to those skilled in the art that various modifications and variations can be made therein without departing from the spirit and scope of the present disclosure. Thus, it is intended that the present disclosure covers the modifications and variations of this invention that come within the scope of the appended claims and their equivalents.

What is claimed is:

1. A method of processing ultra-high definition (UHD) video data in a digital television, the method comprising:
    receiving, by a receiver, a first signal containing first UHD video data and signaling data for identifying the first UHD video data included in the first signal through a single transmission channel;
    decoding, by a decoder, the signaling data from the first signal; decoding, by the decoder, the first UHD video data from the first signal based on the decoded signaling data;
    receiving, by a controller of the digital television, a second signal requesting for converting the first UHD video data to second UHD video data through a remote controller;
    converting, by the controller, the first UHD video data to second UHD video data in response to said second signal;
    displaying, by a display, the second UHD video data on a display screen,
    wherein the first UHD video data corresponds to 4k UHD video data and the second UHD video data corresponds to 8k UHD video data, and
    wherein the first UHD data is converted to the second UHD data using a multi Frame Rate Converter (FRC) structure including a plurality of FRCs, each FRC processing a portion of a single image frame of the first UHD data;
    receiving, by the controller, a third signal for requesting first OSD data and first UI data for an application while the second UHD data is displayed;
    converting, by the controller, the first OSD data and first UI data for the application to the second OSD data and second UI data, which corresponds to the displayed second UHD data, for the application in response to the third signal;
    receiving, by the controller, a fourth signal for changing UI size corresponding to the second UI data; changing, by the controller, the UI size corresponding to the second UI data in response to the fourth signal; and displaying, by the display, a size-changed UI corresponding to the second UI data while the second UHD data is displayed.

2. The method of claim 1, wherein the first UHD video data is received from an external server, the external server including a terrestrial or cable broadcast station, a cloud server, and an High-Definition Multimedia Interface (HDMI) device.

3. The method of claim 1, wherein the signaling data comprises Program Specific information/Program and System information Protocol (PSI/PSIP) data and a Supplemental Enhancement Information (SEI) message.

4. The method of claim 1, wherein each of the plurality of FRCs included in the multi FRC structure is connected to each other using a cascade scheme.

5. The method of claim 1, wherein the plurality of FRCs included in the multi FRC structure are connected to each other using a dual scheme.

6. The method of claim 1, wherein the first UHD data is converted to the second UHD data dedicated to an 8k 60 Hz if two FRCs among the plurality of FRCs are enabled.

7. The method of claim 1, wherein the first UHD data is converted to the second UHD data dedicated to an 8k 120 Hz if two FRCs among the plurality of FRCs are enabled.

8. A digital television for processing ultra-high definition (UHD) video data, the digital television comprising:
    a receiver configured to receive a first signal containing first UHD video data and signaling data for the first UHD video data through a single transmission channel;
    a decoder configured to decode the signaling data from the first signal;
    a controller configured to:
    receive a second signal requesting for converting the first UHD video data to second UHD video data through a remote controller, and convert the first UHD data to the second UHD data in response to the received second signal; and
    a display configured to display the converted second UHD video data on a display screen,
    wherein the first UHD video data corresponds to 4k UHD video data and the second UHD video data corresponds to 8k UHD video data, and
    wherein the controller is configured to:
    control the first UHD data to be converted to the second UHD data using a multi Frame Rate Converter (FRC) structure including a plurality of FRCs, each FRC processing a portion of a single image frame of the first UHD data,
    receive a third signal for requesting first OSD data and first UI data for an application while the second UHD data is displayed,
    convert the first OSD data and first UI data for the application to the second OSD data and second UI data, which corresponds to the displayed second UHD data, for the application in response to the third signal,
    receive, a fourth signal for changing UI size corresponding to the second UI data,
    change the UI size corresponding to the second UI data in response to the fourth signal, and
    display a size-changed UI corresponding to the second UI data while the second UHD data is displayed.

9. The digital device of claim 8, wherein the first UHD video data is received from an external server, the external server including a terrestrial or cable broadcast station, a cloud server, and an High-Definition Multimedia Interface (HDMI) device.

10. The digital device of claim 8, wherein the signaling data comprises Program Specific Information/Program and System Information Protocol (PSI/PSIP) data and a Supplemental Enhancement Information (SEI) message.

11. The digital device of claim 8, wherein each of the plurality of FRCs included in the multi FRC structure is connected to each other using a cascade scheme.

12. The digital device of claim 8, wherein the plurality of FRCs included in the multi FRC structure are connected to each other using a dual scheme.

13. The digital device of claim 8, wherein the first UHD data is converted to the second UHD data dedicated to an 8k 60 Hz if two FRCs among the plurality of FRCs are enabled.

14. The digital device of claim 8, wherein the first UHD data is converted to the second UHD data dedicated to an 8k 120 Hz if two FRCs among the plurality of FRCs are enabled.

* * * * *